(12) United States Patent
Palmer et al.

(10) Patent No.: US 9,959,066 B2
(45) Date of Patent: May 1, 2018

(54) MEMORY-ATTACHED COMPUTING RESOURCE IN NETWORK ON A CHIP ARCHITECTURE TO PERFORM CALCULATIONS ON DATA STORED ON MEMORY EXTERNAL TO THE CHIP

(71) Applicant: KnuEdge Incorporated, San Diego, CA (US)

(72) Inventors: Douglas A. Palmer, San Diego, CA (US); Jerome V. Coffin, San Diego, CA (US); William Christensen Clevenger, San Diego, CA (US)

(73) Assignee: KnuEdge Incorporated, San Diego, CA (US)

( * ) Notice: Subject to any disclaimer, the term of this patent is extended or adjusted under 35 U.S.C. 154(b) by 9 days.

(21) Appl. No.: 15/043,000

(22) Filed: Feb. 12, 2016

(65) Prior Publication Data
US 2017/0235511 A1    Aug. 17, 2017

(51) Int. Cl.
G06F 13/00    (2006.01)
G06F 3/06     (2006.01)
H04L 12/861   (2013.01)

(52) U.S. Cl.
CPC .......... *G06F 3/0629* (2013.01); *G06F 3/0604* (2013.01); *G06F 3/067* (2013.01); *H04L 49/90* (2013.01)

(58) Field of Classification Search
CPC ....... G06F 3/0629; G06F 3/067; G06F 3/0604
See application file for complete search history.

(56) References Cited

U.S. PATENT DOCUMENTS

| | | | |
|---|---|---|---|
| 5,490,007 A * | 2/1996 | Bennett | H04L 49/357 398/2 |
| 5,928,371 A * | 7/1999 | Robinson, Jr. | H04L 1/0071 714/702 |
| 8,655,815 B2 | 2/2014 | Palmer | |
| 8,848,726 B1 | 9/2014 | Palmer | |
| 2002/0116587 A1 * | 8/2002 | Modelski | G06F 13/36 711/154 |
| 2007/0180006 A1 * | 8/2007 | Gyoten | G06F 13/1652 708/200 |
| 2012/0177050 A1 * | 7/2012 | Fujimoto | G06F 12/0661 370/392 |
| 2014/0032457 A1 * | 1/2014 | Palmer | G06N 3/063 706/16 |
| 2014/0156907 A1 * | 6/2014 | Palmer | H04L 49/90 711/5 |
| 2014/0204943 A1 | 7/2014 | Palmer | |
| 2016/0188481 A1 * | 6/2016 | Miller | H04L 67/2842 711/118 |

\* cited by examiner

*Primary Examiner* — Daniel C Chappell
*Assistant Examiner* — Tasnima Matin
(74) *Attorney, Agent, or Firm* — Fish & Richardson P.C.

(57) ABSTRACT

A computing system includes a plurality of computing resources that communicate with each other using network on a chip architecture. One of the plurality of computing resources is attached to memory external to the computing system through an external memory interface. The memory-attached computing resource is configured to read data from the memory and modify the read data prior to either writing the modified data back to the memory, or transmitting the modified data to one or more other of the computing resources, or both.

26 Claims, 13 Drawing Sheets

United States Patent US 9,959,066 B2

MEMORY-ATTACHED COMPUTING RESOURCE IN NETWORK ON A CHIP ARCHITECTURE TO PERFORM CALCULATIONS ON DATA STORED ON MEMORY EXTERNAL TO THE CHIP

FIELD OF THE DISCLOSURE

The technologies described herein relate to a computing resource attached to memory through an external memory interface, where the memory-attached computing resource is part of a plurality of computing resources that communicate with each other using a network on a chip architecture, the memory-attached computing resource being configured to read data from the memory and modify the read data prior to either writing the modified data back to the memory, or transmitting the modified data to one or more other of the computing resources, or both.

BACKGROUND

Historically, computer systems have been designed around a central processing unit (CPU). Nearly all of the "intelligence" in the computer system was in the CPU, which was responsible not only for carrying out computation tasks, but for carrying out operating system (OS) functions, e.g., for scheduling OS tasks, and for input/output functions, e.g., for reading/writing data from/to disk drives, sending data to printers, etc. To this end, the CPU was designed with an emphasis on versatility and speed—so the CPU could carry out almost any task, and run fast enough that most of what it did appeared nearly instantaneous. The foregoing approach to computer system design, however, came at considerable expense in complexity and power consumption. For decades, neither the complexity nor the power consumption was given much consideration, because technological advances in integrated circuit fabrication techniques increased the number and speed of transistors available for a given price point. Although advances in integrated circuit fabrication continue, the degree of improvement over time has slowed substantially, especially with respect to clock speed. For decades, the limit on computer system performance has been imposed primarily by transistor fabrication technology.

More recently, however, the primary limit has been imposed by power consumption and dissipation. As such, the main challenge in designing a computer system is no longer to simply make it fast. The main challenge is making the computer system power efficient, to maximize the number of tasks that can be performed by the computer system using a given amount of power. A way to respond to this challenge is to off-load tasks from the CPU to more specialized hardware. One area that many conventional computer system designs have attempted to address is offloading input/output (I/O) tasks from the CPU. I/O tasks typically happen relatively slowly compared to the speed capability of the CPU, so when carried out by the CPU, the I/O tasks frequently have consumed a great deal of power to that could have instead be used for mission critical computations. To avoid that, many conventional computer systems have included various types of ancillary hardware to assist with I/O tasks, e.g., checking, formatting, framing and timing of incoming/outgoing streams of data, freeing the CPU to carry out other tasks.

SUMMARY

Whereas the foregoing conventional computer system designs have chosen to assist a CPU with specialized hardware for communicating with devices external to the computing system that are relatively slow (e.g., disk drives and printers), the disclosed technologies assist one or more CPUs of a computer system with specialized hardware for communicating with memory that is external to the computing system. The specialized hardware disclosed in this specification—is attached to the memory via an external memory interface and with the CPU(s) via a network-like interface—to provide indirect coupling between the CPU(s) and the memory. In some implementations, the disclosed computing system includes a plurality of computing resources that communicate with each other via network on a chip architecture. Here, some of the computing resources are processing engines, while one of the computing resources is the disclosed specialized hardware that is attached to the memory via the external memory interface. Note that the disclosed specialized hardware is referred to as memory-attached computing resource.

Particular aspects of the disclosed technologies can be implemented so as to realize one or more of the following potential advantages. Each of the processing engines of the disclosed computing system can access the memory with assistance only from the disclosed memory-attached computing resource, without having to either (1) request assistance from another of the processing engines to access the memory or (2) assist another of the processing engines to access the memory. In contrast, in some conventional computing systems, memory is divided into physical segments, and each segment is tightly coupled to a small number (e.g., 2 to 4) of processor engines that form a "node". If a processing engine needs access to data stored outside its node, the processing engine needs to send a memory read request to another processing engine in the node that holds that data, which then issues the read request to the memory and forwards the result to the processing engine that originated the request. In such conventional computing systems, this can result in many processing engines spending a great deal of their time on the relatively simple task of just reading and writing data on behalf of other processing engines outside their node. In addition, designing programs to work efficiently on such conventional computing systems is relatively complex, as effort is expended in attempting to arrange the data to minimize cross-node communication. For these reasons, such conventional computing systems can scale relatively poorly. For example, doubling the number of processing engines typically would not double the conventional computer system's overall speed. At some point a limit is reached, so that adding more processing engines actually slows down such a conventional computing system. By tasking the disclosed memory-attached computing resource with memory access functions, the processing engines of the disclosed computing system can focus on computation, rather than any one of the processing engines having to be involved in another one of the processing engines' access to memory.

Power consumption of a computer system that includes the disclosed memory-attached computing resource can be improved relative to conventional computing systems. Rather than having processing engines waiting for memory transactions (e.g., reads or writes) conventionally performed by the processing engines themselves, the processing engines simply request that the disclosed memory-attached computing resource carry out needed memory transaction(s). That can free the processing engines of the disclosed computing system to either carry out some other computation (if available/necessary) or else go idle while the disclosed memory-attached computing resource carries out the requested memory transaction(s), minimizing power consumption until the requested data is available. As a result, the disclosed computing system can be scaled to a much larger number of processing engines, run faster overall, and reduce the power consumed to carry out computations relative to a conventional computing system.

Moreover, the disclosed memory-attached computing resource can be configured to perform uninterruptible tasks (e.g., atomic memory operations) that are useful for synchronizing data processing among computing resources of a computing system. Further, the disclosed memory-attached computing resource can be configured to perform "chained operations", in which an output of one operation becomes an input to another. The latter feature can minimize latency and dead cycles in a cut-through computation system. For example, half of the clock cycles used in data transport, can be beneficially used in non-data transport (e.g., mission critical) computations when a computing system includes the disclosed memory-attached computing resource.

Furthermore, the disclosed memory-attached computing resource can be configured to calculate running sums or to transpose matrices, for instance, using data read from the memory and writing/transmitting the calculated running sums or the transposed matrices back to the memory/to a processing engine of the disclosed computing system. In addition to having the foregoing new capabilities, the memory-attached computing resource can efficiently and effectively perform operations such as write to memory, read from memory, append data to a packet, broadcast notifications relating to completed operations to one or more notification targets, etc.

Details of one or more implementations of the disclosed technologies are set forth in the accompanying drawings and the description below. Other features, aspects, descriptions and potential advantages will become apparent from the description, the drawings and the claims.

Certain illustrative aspects of the systems, apparatuses, and methods according to the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the figures.

DETAILED DESCRIPTION

Technologies are described that can be used in a computing system including a plurality of computing resources that communicate with each other using network on a chip architecture. One of the plurality of computing resources is attached to memory external to the computing system through an external memory interface. The memory-attached computing resource is configured to read data from the memory and modify the read data prior to either writing the modified data back to the memory, or transmitting the modified data to one or more other of the computing resources, or both. The memory-attached computing resource includes two or more state machines, a multiplexer (MUX) and an arithmetic logic unit (ALU). The state machines are configured to parse/generate incoming/outgoing packets, and read/write data from/to the memory, the MUX is configured to move data between the state machines either through or bypassing the ALU, and the ALU is configured to operate on data provided by the MUX.

Prior to describing example implementations of the memory-attached computing resource of the computing system, in which communication between computing resources of the computing system is carried out based on network on a chip architecture, structural aspects and functional aspects of the computing system and of the computing resources are described first.

Figure 1A:
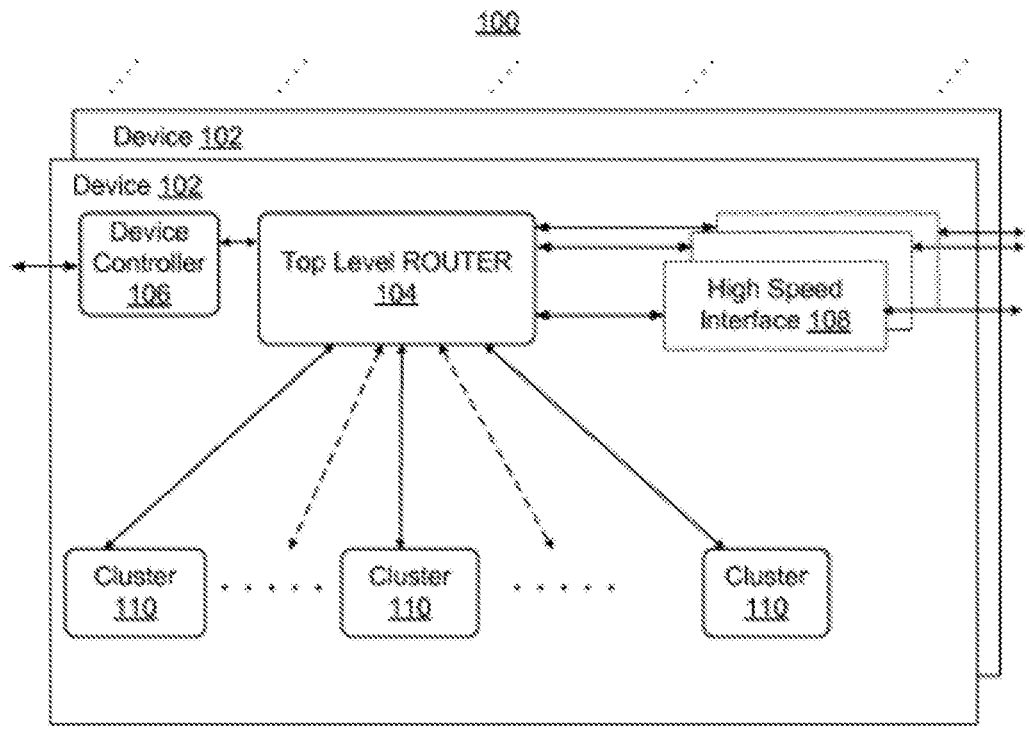
FIG. 1A is a block diagram of an example of a computing system.

FIG. 1A shows an exemplary computing system 100 according to the present disclosure. The computing system 100 includes at least one processing device 102. A typical computing system 100, however, may include a plurality of processing devices 102. In some implementations, each processing device 102, which may also be referred to as device 102, includes a router 104, a device controller 106, a plurality of high speed interfaces 108 and a plurality of clusters 110. The router 104 may also be referred to as a top level router or a level one router. Each cluster 110 includes a plurality of processing engines to provide computational capabilities for the computing system 100. In some implementations, the high speed interfaces 108 include communication ports to communicate data outside of the device 102, for example, to other devices 102 of the computing system 100 and/or interfaces to other computing systems. Unless specifically expressed otherwise, data as used herein may refer to both program code and pieces of information upon which the program code operates.

In some implementations, the processing device 102 includes 2, 4, 8, 16, 32 or another number of high speed interfaces 108. Each high speed interface 108 may implement a physical communication protocol. For example, each high speed interface 108 implements the media access control (MAC) protocol, and thus may have a unique MAC address associated with it. The physical communication may be implemented in a known communication technology, for example, Gigabit Ethernet, or any other existing or future-developed communication technology. For example, each high speed interface 108 implements bi-directional high-speed serial ports, such as 10 Giga bits per second (Gbps) serial ports. Two processing devices 102 implementing such high speed interfaces 108 may be directly coupled via one pair or multiple pairs of the high speed interfaces 108, with each pair including one high speed interface 108 on one processing device 102 and another high speed interface 108 on the other processing device 102.

Figure 5:
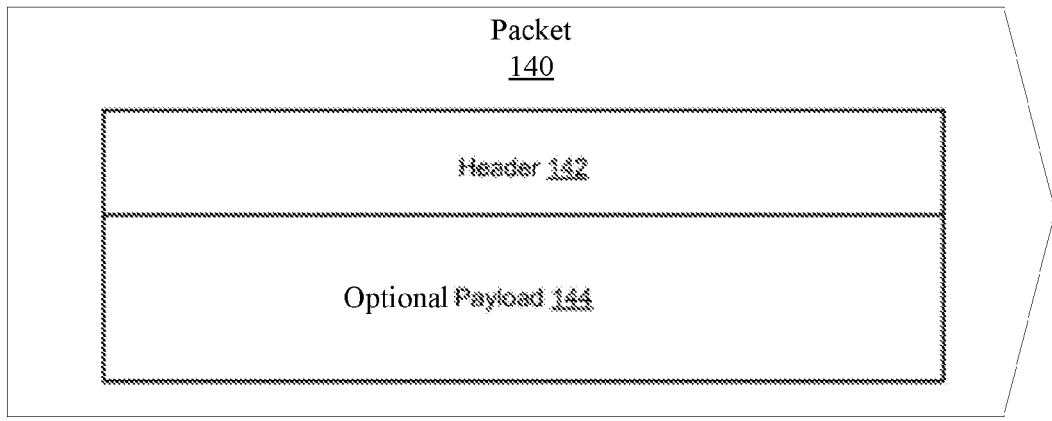
FIG. 5 is a block diagram of an example of a packet used to address a computing resource of a computing system.

In accordance with network on a chip architecture, data communication between different computing resources of the computing system 100 is implemented using routable packets. The computing resources include device level resources such as a device controller 106, cluster level resources such as a cluster controller or cluster memory controller, and/or the processing engine level resources such as individual processing engines and/or individual processing engine memory controllers. An example of a routable packet 140 (or simply packet 140) is shown in FIG. 5. The packet 140 includes a header 142. Optionally, the packet also includes a payload 144. The header 142 includes a routable destination address for the packet 140. The router 104 may be a top-most router configured to route packets on each processing device 102. In some implementations, the router 104 is a programmable router. That is, the routing information used by the router 104 may be programmed and updated. In some cases, the router 104 is implemented using an address resolution table (ART) or Look-up table (LUT) to route any packet it receives on the high speed interfaces 108, or any of the internal interfaces interfacing the device controller 106 or clusters 110. For example, depending on the destination address, a packet 140 received from one cluster 110 may be routed to a different cluster 110 on the same processing device 102, or to a different processing device 102; and a packet 140 received from one high speed interface 108 may be routed to a cluster 110 on the processing device or to a different processing device 102.

In some implementations, the device controller 106 controls the operation of the processing device 102 from power on through power down. In some implementations, the device controller 106 includes a device controller processor, one or more registers and a device controller memory space. The device controller processor may be any existing or future-developed microcontroller. In some implementations, for example, an ARM® Cortex M0 microcontroller is used for its small footprint and low power consumption. In other implementations, a bigger and more powerful microcontroller is chosen if needed. The one or more registers include one to hold a device identifier (DEVID) for the processing device 102 after the processing device 102 is powered up. The DEVID is used to uniquely identify the processing device 102 in the computing system 100. In some implementations, the DEVID is loaded on system start from a non-volatile storage, for example, a non-volatile internal storage on the processing device 102 or a non-volatile external storage. The device controller memory space may include both read-only memory (ROM) and random access memory (RAM). In some implementations, the ROM may store bootloader code that during a system start is executed to initialize the processing device 102 and load the remainder of the boot code through a bus from outside of the device controller 106. In some implementations, the instructions for the device controller processor, also referred to as the firmware, reside in the RAM after they are loaded during the system start.

Here, the registers and device controller memory space of the device controller 106 are read and written to by computing resources of the computing system 100 using packets. That is, they are addressable using packets. As used herein, the term "memory" may refer to RAM, SRAM, DRAM, eDRAM, SDRAM, volatile memory, non-volatile memory, and/or other types of electronic memory. For example, the header of a packet includes a destination address such as DEVID:PADDR, of which the DEVID may identify the processing device 102 and the PADDR may be an address for a register of the device controller 106 or a memory location of the device controller memory space of a processing device 102. In some implementations, a packet directed to the device controller 106 has a packet operation code, which may be referred to as packet opcode or just opcode, to indicate what operation needs to be performed for the packet. For example, the packet operation code may indicate reading from or writing to the storage location pointed to by PADDR. It should be noted that the device controller 106 also sends packets in addition to receiving them. The packets sent by the device controller 106 may be self-initiated or in response to a received packet (e.g., a read request). Self-initiated packets include, for example, reporting status information, requesting data, etc.

Figure 1B:
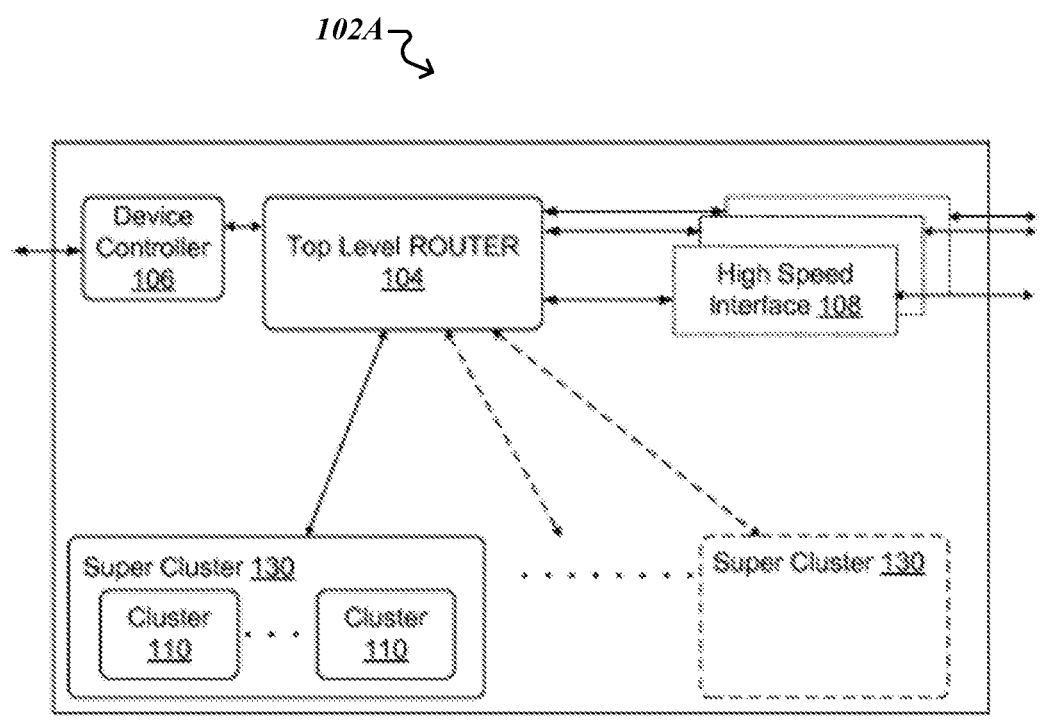
FIG. 1B is a block diagram of an example of a processing device of a computing system.

In some implementations, a plurality of clusters 110 on a processing device 102 are grouped together. FIG. 1B shows a block diagram of another example of a processing device 102A of the computing system 100. The example processing device 102A is one particular embodiment of the processing device 102. Therefore, the processing device 102 referred to in the present disclosure may include any embodiments of the processing device 102, including the example processing device 102A. As shown on FIG. 1B, a plurality of clusters 110 may be grouped together to form a super cluster 130 and the example of processing device 102A may include a plurality of such super clusters 130. In some implementations, a processing device 102 includes 2, 4, 8, 16, 32 or another number of clusters 110, without further grouping the clusters 110 into super clusters. In other implementations, a processing device 102 may include 2, 4, 8, 16, 32 or another number of super clusters 130 and each super cluster 130 may comprise a plurality of clusters.

Figure 2A:
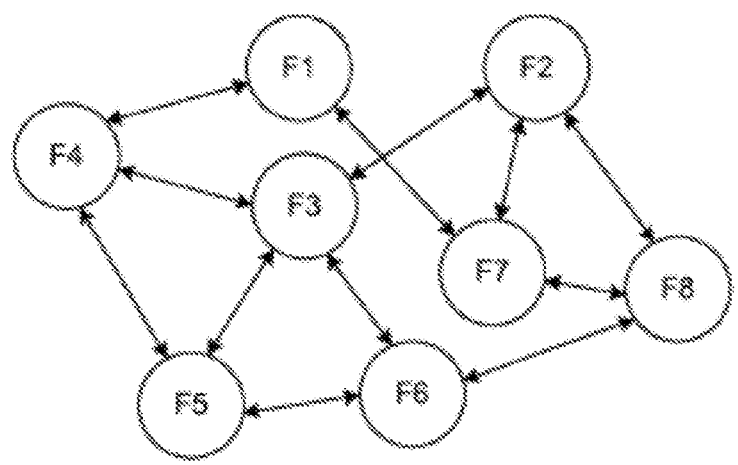
FIG. 2A is a block diagram of topology of connections of an example of a computing system.

FIG. 2A shows a block diagram of an example of a computing system 100A. The computing system 100A may be one example implementation of the computing system 100 of FIG. 1A. The computing system 100A includes a plurality of processing devices 102 designated as F1, F2, F3, F4, F5, F6, F7 and F8. As shown in FIG. 2A, each processing device 102 is directly coupled to one or more other processing devices 102. For example, F4 is directly coupled to F1, F3 and F5; and F7 is directly coupled to F1, F2 and F8. Within computing system 100A, one of the processing devices 102 may function as a host for the whole computing system 100A. In some implementations, the host has a unique device ID that every processing devices 102 in the computing system 100A recognizes as the host. Any of the processing devices 102 may be designated as the host for the computing system 100A. For example, F1 may be designated as the host and the device ID for F1 is set as the unique device ID for the host.

In other implementations, the host is a computing device of a different type, such as a computer processor (for example, an ARM® Cortex or Intel® x86 processor). Here, the host communicates with the rest of the system 100A through a communication interface, which represents itself to the rest of the system 100A as the host by having a device ID for the host.

The computing system 100A may implement any appropriate techniques to set the DEVIDs, including the unique DEVID for the host, to the respective processing devices 102 of the computing system 100A. In some implementations, the DEVIDs are stored in the ROM of the respective device controller 106 for each processing devices 102 and loaded into a register for the device controller 106 at power up. In other implementations, the DEVIDs are loaded from an external storage. Here, the assignments of DEVIDs may be performed offline (when there is no application running in the computing system 100A), and may be changed offline from time to time or as appropriate. Thus, the DEVIDs for one or more processing devices 102 may be different each time the computing system 100A initializes. Moreover, the DEVIDs stored in the registers for each device controller 106 may be changed at runtime. This runtime change is controlled by the host of the computing system 100A. For example, after the initialization of the computing system 100A, which loads the pre-configured DEVIDs from ROM or external storage, the host of the computing system 100A may reconfigure the computing system 100A and assign different DEVIDs to the processing devices 102 in the computing system 100A to overwrite the initial DEVIDs in the registers of the device controllers 106.

Figure 2B:
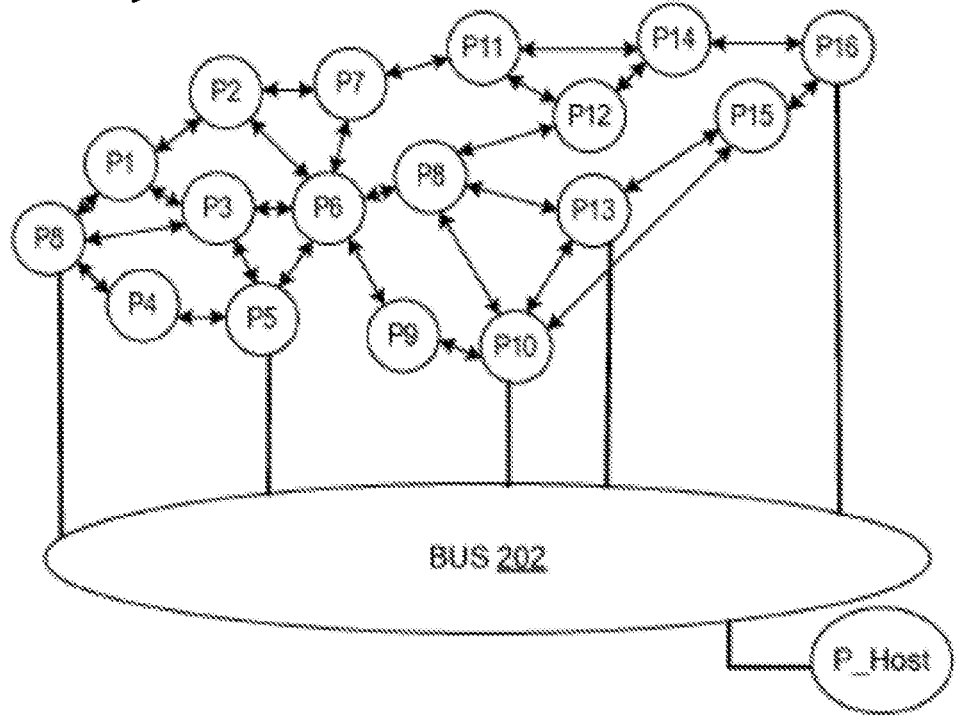
FIG. 2B is a block diagram of topology of connections of another example of a computing system.

FIG. 2B is a block diagram of a topology of another example of a computing system 100B. The computing system 100B is another example implementation of the computing system 100 of FIG. 1 and includes a plurality of processing devices 102 (designated as P1 through P16 on FIG. 2B), a bus 202 and a processing device P_Host. Each processing device of P1 through P16 is directly coupled to another processing device of P1 through P16 by a direct link between them. At least one of the processing devices P1 through P16 is coupled to the bus 202. In the example shown in FIG. 2B, the processing devices P8, P5, P10, P13, P15 and P16 are coupled to the bus 202. Here, the processing device P_Host is coupled to the bus 202 and is designated as the host for the computing system 100B. In the computing system 100B, the host may be a computer processor (for example, an ARM® Cortex or Intel® x86 processor). The host communicates with the rest of the computing system 100B through a communication interface coupled to the bus and represents itself to the rest of the system 100B as the host by having a device ID for the host.

Figure 3A:
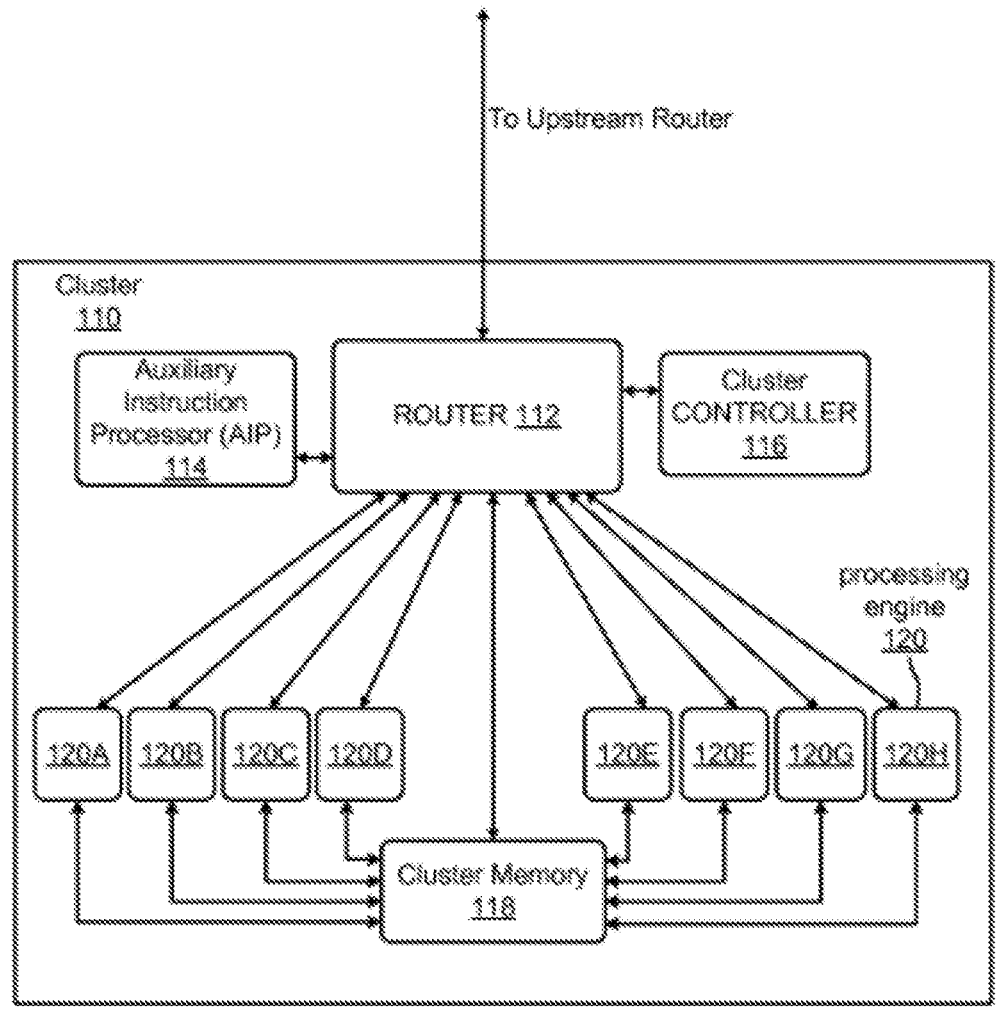
FIG. 3A is a block diagram of an example of a cluster of a computing device.

FIG. 3A shows a block diagram of an example of a cluster 110. The cluster 110 includes a router 112, a cluster controller 116, an auxiliary instruction processor (AIP) 114, a cluster memory 118 and a plurality of processing engines 120. The router 112 is coupled to an upstream router to provide interconnection between the upstream router and the cluster 110. The upstream router may be, for example, the router 104 of the processing device 102 if the cluster 110 is not part of a super cluster 130.

In accordance with network on a chip architecture, examples of operations to be performed by the router 112 include receiving a packet destined for a computing resource within the cluster 110 from outside the cluster 110 and/or transmitting a packet originating within the cluster 110 destined for a computing resource inside or outside the cluster 110. A computing resource within the cluster 110 may be, for example, the cluster memory 118 or any of the processing engines 120 within the cluster 110. A computing resource outside the cluster 110 may be, for example, a computing resource in another cluster 110 of the computer device 102, the device controller 106 of the processing device 102, or a computing resource on another processing device 102. In some implementations, the router 112 also transmits a packet to the router 104 even if the packet may target a resource within itself. In some cases, the router 104 implements a loopback path to send the packet back to the originating cluster 110 if the destination resource is within the cluster 110.

In some implementations, the cluster controller 116 sends packets, for example, as a response to a read request, or as unsolicited data sent by hardware for error or status report. The cluster controller 116 also receives packets, for example, packets with opcodes to read or write data. In some implementations, the cluster controller 116 is a microcontroller, for example, one of the ARM® Cortex-M microcontrollers and includes one or more cluster control registers (CCRs) that provide configuration and control of the cluster 110. In other implementations, instead of using a microcontroller, the cluster controller 116 is custom made to implement any functionalities for handling packets and controlling operation of the router 112. Here, the functionalities may be referred to as custom logic and may be implemented, for example, by FPGA or other specialized circuitry. Regardless of whether it is a microcontroller or implemented by custom logic, the cluster controller 116 may implement a fixed-purpose state machine encapsulating packets and memory access to the CCRs.

In some implementations, each cluster memory 118 is part of the overall addressable memory of the computing system 100. That is, the addressable memory of the computing system 100 includes the cluster memories 118 of all clusters of all devices 102 of the computing system 100. The cluster memory 118 is a part of the main memory shared by the computing system 100. In some implementations, any memory location within the cluster memory 118 may be addressed by any processing engine within the computing system 100 by a physical address. In some implementations, the physical address is a combination of the DEVID, a cluster identifier (CLSID) and a physical address location (PADDR) within the cluster memory 118. As such, the physical address is formed as a string of bits, e.g., DEVID:CLSID:PADDR. The DEVID may be associated with the device controller 106 as described above and the CLSID may be a unique identifier to uniquely identify the cluster 110 within the local processing device 102. It should be noted that in at least some implementations, each register of the cluster controller 116 also be assigned a physical address (PADDR). Therefore, the physical address DEVID:CLSID:PADDR may also be used to address a register of the cluster controller 116, in which PADDR may be an address assigned to the register of the cluster controller 116.

In some other implementations, any memory location within the cluster memory 118 is addressed by any processing engine within the computing system 100 by a virtual address. The virtual address may be a combination of a DEVID, a CLSID and a virtual address location (ADDR). As such, the virtual address is formed as a string of bits, e.g., DEVID:CLSID:ADDR. The DEVID and CLSID in the virtual address may be the same as in the physical addresses.

In some cases, the width of ADDR is specified by system configuration. For example, the width of ADDR is loaded into a storage location convenient to the cluster memory 118 during system start and/or changed from time to time when the computing system 100 performs a system configuration. In some implementations, to convert the virtual address to a physical address, the value of ADDR is added to a base physical address value (BASE). The BASE may also be specified by system configuration as the width of ADDR and stored in a location convenient to a memory controller of the cluster memory 118. In one example, the width of ADDR is stored in a first register and the BASE is stored in a second register in the memory controller. Thus, the virtual address DEVID:CLSID:ADDR is converted to a physical address as DEVID:CLSID:ADDR+BASE. Note that the result of ADDR+BASE has the same width as the target physical address.

The address in the computing system 100 may be 8 bits, 16 bits, 32 bits, 64 bits, or any other number of bits wide. In some implementations, the address is 32 bits wide. The DEVID may be 10, 15, 20, 25 or any other number of bits wide. The width of the DEVID is chosen based on the size of the computing system 100, for example, how many processing devices 102 the computing system 100 has or is designed to have. In some implementations, the DEVID is 20 bits wide and the computing system 100 using this width of DEVID contains up to $2^{20}$ processing devices 102. The width of the CLSID is chosen based on how many clusters 110 the processing device 102 is designed to have. For example, the CLSID may be 3, 4, 5, 6, 7, 8 bits or any other number of bits wide. In some implementations, the CLSID is 5 bits wide and the processing device 102 using this width of CLSID contains up to $2^5$ clusters. The width of the PADDR for the cluster level may be 20, 30 or any other number of bits. For example, the PADDR for the cluster level is 27 bits and the cluster 110 using this width of PADDR contains up to $2^{27}$ memory locations and/or addressable registers. Therefore, in some implementations, if the DEVID is 20 bits wide, CLSID is 5 bits and PADDR has a width of 27 bits, then a physical address DEVID:CLSID:PADDR or DEVID:CLSID:ADDR+BASE is 52 bits.

For performing the virtual to physical memory conversion, the first register (ADDR register) may have 4, 5, 6, 7 bits or any other number of bits. In some implementations, the first register is 5 bits wide. If the value of the 5 bits register is four (4), the width of ADDR is 4 bits; and if the value of 5 bits register is eight (8), the width of ADDR will be 8 bits. Regardless of ADDR being 4 bits or 8 bits wide, if the PADDR for the cluster level is 27 bits, then BASE is 27 bits, and the result of ADDR+BASE still is a 27 bits physical address within the cluster memory 118.

In the example illustrated in FIG. 3A, a cluster 110 includes one cluster memory 118. In other examples, a cluster 110 includes a plurality of cluster memories 118 that each includes a memory controller and a plurality of memory banks, respectively. Moreover, in yet another example, a cluster 110 includes a plurality of cluster memories 118 and these cluster memories 118 are connected together via a router that are downstream of the router 112.

The AIP 114 is a special processing engine shared by all processing engines 120 of one cluster 110. In some implementations, the AIP 114 is implemented as a coprocessor to the processing engines 120. For example, the AIP 114 implements less commonly used instructions such as some floating point arithmetic, including but not limited to, one or more of addition, subtraction, multiplication, division and square root, etc. In the example shown in FIG. 3A, the AIP 114 is coupled to the router 112 directly and is configured to send and receive packets via the router 112. As a coprocessor to the processing engines 120 within the same cluster 110, although not shown in FIG. 3A, the AIP 114 may also be coupled to each processing engines 120 within the same cluster 110 directly. In other implementations, a bus shared by all the processing engines 120 within the same cluster 110 is used for communication between the AIP 114 and all the processing engines 120 within the same cluster 110. In some other implementations, a multiplexer is used to control access to the bus shared by all the processing engines 120 within the same cluster 110 for communication with the AIP 114. In yet other implementations, a multiplexer is used to control communication between the AIP 114 and all the processing engines 120 within the same cluster 110.

Figure 3B:
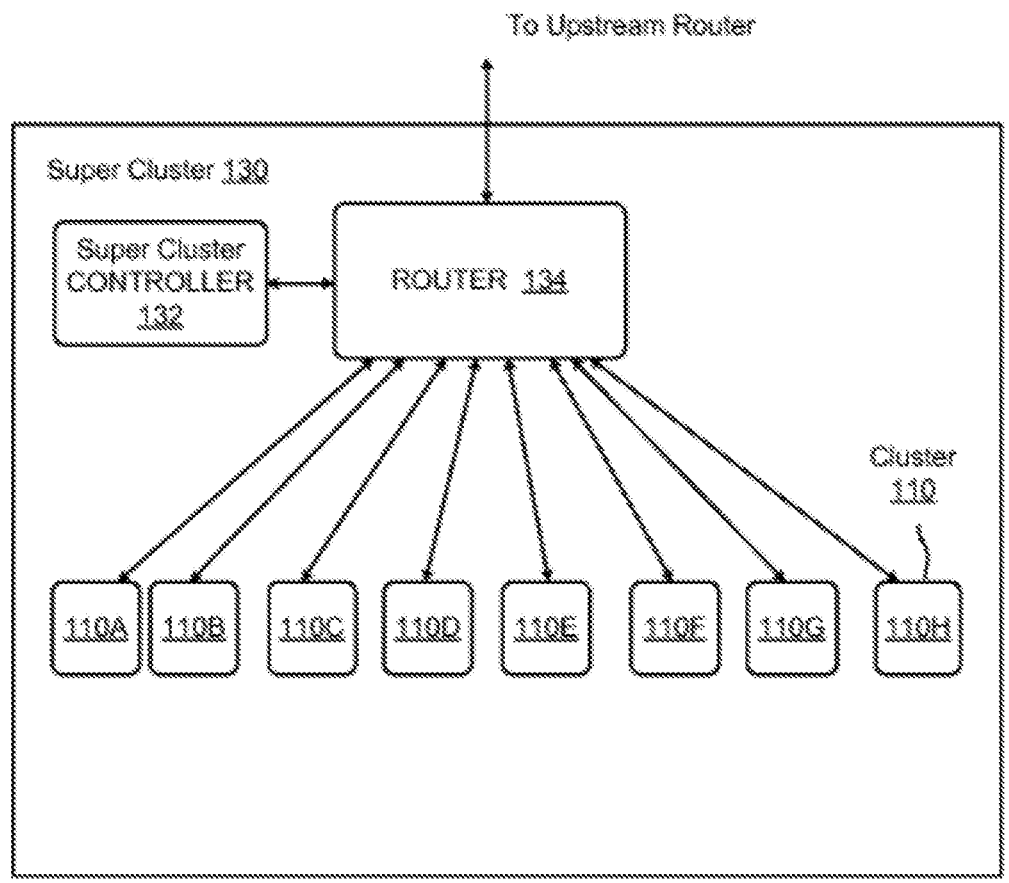
FIG. 3B is a block diagram of an example of a super cluster of a computing device.

The grouping of the processing engines 120 on a computing device 102 may have a hierarchy with multiple levels. For example, multiple clusters 110 are grouped together to form a super cluster. FIG. 3B is a block diagram of an example of a super cluster 130 of the computing device 102. In the example shown in FIG. 3B, a plurality of clusters 110A through 110H are grouped into the super cluster 130. Although 8 clusters are shown in the super cluster 130 on FIG. 3B, the super cluster 130 may include 2, 4, 8, 16, 32 or another number of clusters 110. The super cluster 130 includes a router 134 and a super cluster controller 132, in addition to the plurality of clusters 110. The router 134 is configured to route packets among the clusters 110 and the super cluster controller 132 within the super cluster 130, and to and from computing resources outside the super cluster 130 via a link to an upstream router. In implementations in which the super cluster 130 is used in a processing device 102A, the upstream router for the router 134 is the top level router 104 of the processing device 102A and the router 134 is an upstream router for the router 112 within the cluster 110. In some implementations, the super cluster controller 132 may be configured to implement CCRs, receive and send packets, and implement a fixed-purpose state machine encapsulating packets and memory access to the CCRs. In some cases, the super cluster controller 132 is implemented similar to the way the cluster controller 116 is implemented in a cluster 110. In other implementations, the super cluster 130 is implemented with just the router 134 and does not have a super cluster controller 132.

As noted above, a cluster 110 may include 2, 4, 8, 16, 32 or another number of processing engines 120. FIG. 3A shows an example of a plurality of processing engines 120 that have been grouped into a cluster 110, and FIG. 3B shows an example of a plurality of clusters 110 that have been grouped into a super cluster 130. Grouping of processing engines is not limited to clusters or super clusters. In some implementations, more than two levels of grouping is implemented and each level has its own router and controller.

Figure 4:
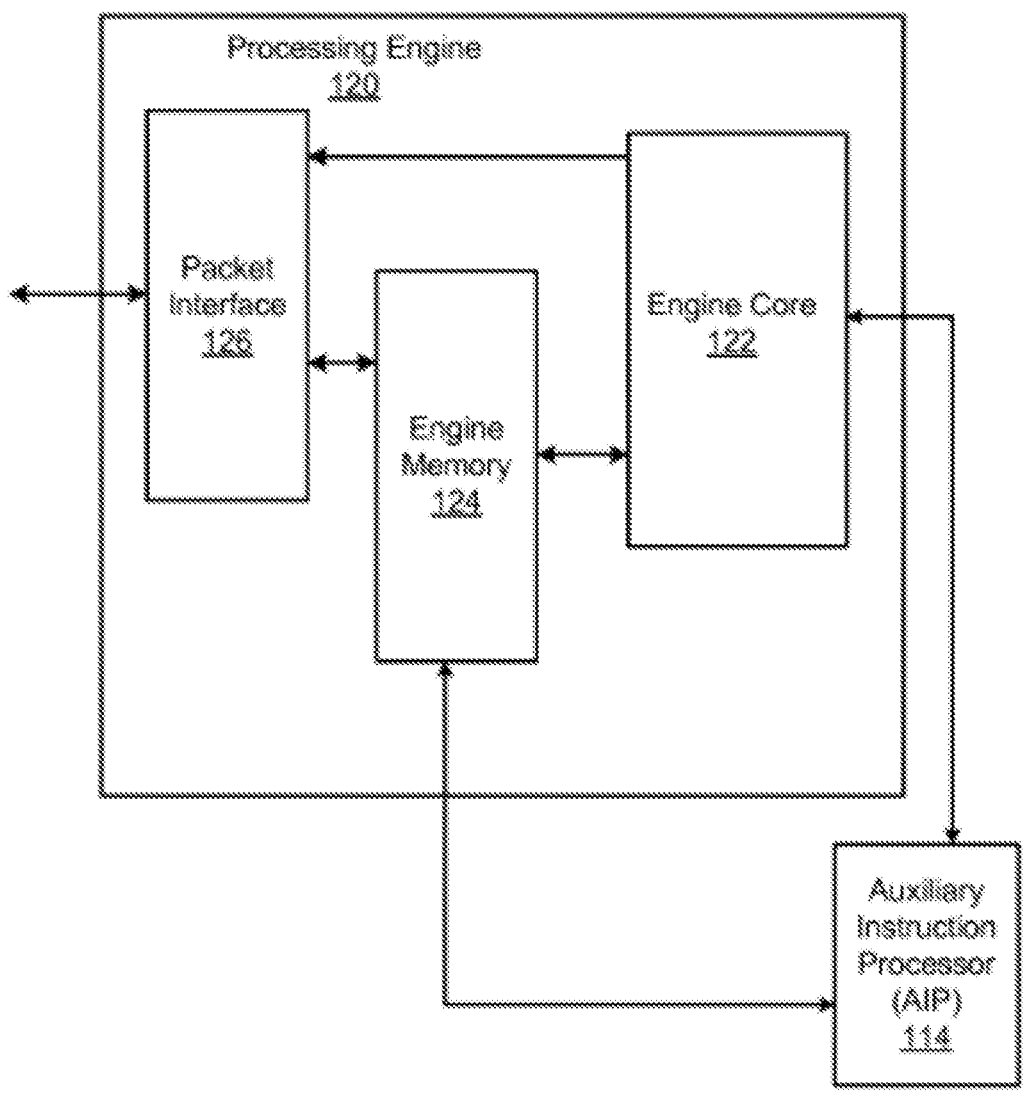
FIG. 4 is a block diagram of an example of a processing engine of a cluster.

FIG. 4 shows a block diagram of an example of a processing engine 120 of a processing device 102. In the example shown in FIG. 4, the processing engine 120 includes an engine core 122, an engine memory 124 and a packet interface 126. Here, the processing engine 120 is directly coupled to an AIP 114. As described above, the AIP 114 may be shared by all processing engines 120 within a cluster 110. In some implementations, the processing core 122 is a central processing unit (CPU) with an instruction set and implements some or all features of modern CPUs, such as, for example, a multi-stage instruction pipeline, one or more arithmetic logic units (ALUs), one or more floating point units (FPUs) or any other CPU technology. The instruction set includes one instruction set for the ALU to perform arithmetic and logic operations, and another instruction set for the FPU to perform floating point operations. In some cases, the FPU is a completely separate execution unit containing a multi-stage, single-precision floating point pipeline. When an FPU instruction reaches the instruction pipeline of the processing engine 120, the instruction and its source operand(s) are dispatched to the FPU.

The instructions of the instruction set may implement the arithmetic and logic operations and the floating point operations, such as those in the INTEL® x86 instruction set, using a syntax similar or different from the x86 instructions. In some implementations, the instruction set includes customized instructions. For example, one or more instructions are implemented according to the features of the computing system 100 and in accordance with network on a chip architecture. In one example, one or more instructions cause the processing engine executing the instructions to generate packets directly with system wide addressing. In another example, one or more instructions have a memory address located anywhere in the computing system 100 as an operand. In the latter example, a memory controller of the processing engine executing the instruction generates packets according to the memory address being accessed.

The engine memory 124 includes a program memory, a register file including one or more general purpose registers, one or more special registers and one or more events registers. In some implementations, the program memory is a physical memory for storing instructions to be executed by the processing core 122 and data to be operated upon by the instructions. In some cases, portions of the program memory are disabled and powered down for energy savings. For example, a top half or a bottom half of the program memory is disabled to save energy when executing a program small enough that half or less of the storage may be needed. The size of the program memory may be 1 thousand (1K), 2K, 3K, 4K, or any other number of storage units. The register file may include 128, 256, 512, 1024, or any other number of storage units. In some implementations, the storage unit is 32-bit wide, which may be referred to as a longword, and the program memory includes 2K 32-bit longwords and the register file includes 256 32-bit registers.

In some implementations, the register file includes one or more general purpose registers and special registers for the processing core 122. The general purpose registers serve functions that are similar or identical to the general purpose registers of an x86 architecture CPU. The special registers are used for configuration, control and/or status, for instance. Examples of special registers include one or more of the following registers: a next program counter, which may be used to point to the program memory address where the next instruction to be executed by the processing core 122 is stored; and a device identifier (DEVID) register storing the DEVID of the processing device 102.

In some implementations, the register file is implemented in two banks—one bank for odd addresses and one bank for even addresses—to permit multiple fast accesses during operand fetching and storing. The even and odd banks are selected based on the least-significant bit of the register address if the computing system 100 is implemented in little endian or on the most-significant bit of the register address if the computing system 100 is implemented in big-endian.

In some implementations, the engine memory 124 is part of the addressable memory space of the computing system 100. That is, any storage location of the program memory, any general purpose register of the register file, any special register of the plurality of special registers and any event register of the plurality of events registers is assigned a memory address PADDR. Each processing engine 120 on a processing device 102 is assigned an engine identifier (ENGINE ID), therefore, to access the engine memory 124, any addressable location of the engine memory 124 may be addressed by DEVID:CLSID:ENGINE ID:PADDR. In some cases, a packet addressed to an engine level memory location includes an address formed as DEVID:CLSID: ENGINE ID:EVENTS:PADDR, in which EVENTS is one or more bits to set event flags in the destination processing engine 120. It should be noted that when the address is formed as such, the events need not form part of the physical address, which is still DEVID:CLSID:ENGINE ID:PADDR. In this form, the events bits may identify one or more event registers to be set but these events bits are separate from the physical address being accessed.

In accordance with network on a chip architecture, the packet interface 126 includes a communication port for communicating packets of data. The communication port is coupled to the router 112 and the cluster memory 118 of the local cluster. For any received packets, the packet interface 126 directly passes them through to the engine memory 124. In some cases, a processing device 102 implements two mechanisms to send a data packet to a processing engine 120. A first mechanism uses a data packet with a read or write packet opcode. This data packet is delivered to the packet interface 126 and handled by the packet interface 126 according to the packet opcode. Here, the packet interface 126 includes a buffer to hold a plurality of storage units, for example, 1K, 2K, 4K, or 8K or any other number. In a second mechanism, the engine memory 124 further includes a register region to provide a write-only, inbound data interface, which may be referred to a mailbox. In some implementations, the mailbox includes two storage units that each can hold one packet at a time. Here, the processing engine 120 has an event flag, which is set when a packet has arrived at the mailbox to alert the processing engine 120 to retrieve and process the arrived packet. While this packet is being processed, another packet may be received in the other storage unit, but any subsequent packets are buffered at the sender, for example, the router 112 or the cluster memory 118, or any intermediate buffers.

In various implementations, data request and delivery between different computing resources of the computing system 100 is implemented by packets. FIG. 5 illustrates a block diagram of an example of a packet 140 in accordance with network on a chip architecture. As shown in FIG. 5, the packet 140 includes a header 142 and an optional payload 144. The header 142 includes a single address field, a packet opcode (POP) field and a size field. The single address field indicates the address of the destination computing resource of the packet, which may be, for example, an address at a device controller level such as DEVID:PADDR, an address at a cluster level such as a physical address DEVID:CLSID: PADDR or a virtual address DEVID:CLSID:ADDR, or an address at a processing engine level such as DEVID:CLSID: ENGINE ID:PADDR or DEVID:CLSID:ENGINE ID:EVENTS:PADDR. The POP field may include a code to indicate an operation to be performed by the destination computing resource. Exemplary operations in the POP field may include read (to read data from the destination) and write (to write data (e.g., in the payload 144) to the destination).

In some implementations, examples of operations in the POP field further include bulk data transfer. For example, certain computing resources implement a direct memory access (DMA) feature. Examples of computing resources that implement DMA may include a cluster memory controller of each cluster memory 118, a memory controller of each engine memory 124, and a memory controller of each device controller 106. Any computing resource that implements the DMA may perform bulk data transfer to another computing resource using packets with a packet opcode for bulk data transfer.

In addition to bulk data transfer, the examples of operations in the POP field further include transmission of unsolicited data. For example, any computing resource may generate a status report or incur an error during operation, the status or error is reported to a destination using a packet with a packet opcode indicating that the payload 144 contains the source computing resource and the status or error data.

The POP field may be 2, 3, 4, 5 or any other number of bits wide. In some implementations, the width of the POP field is selected depending on the number of operations defined for packets in the computing system 100. Also, in some embodiments, a packet opcode value can have different meaning based on the type of the destination computing resource that receives it. For example, for a three-bit POP field, a value 001 may be defined as a read operation for a processing engine 120 but a write operation for a cluster memory 118.

In some implementations, the header 142 further includes an addressing mode field and an addressing level field. Here, the addressing mode field contains a value to indicate whether the single address field contains a physical address or a virtual address that may need to be converted to a physical address at a destination. Further here, the addressing level field contains a value to indicate whether the destination is at a device, cluster memory or processing engine level.

The payload 144 of the packet 140 is optional. If a particular packet 140 does not include a payload 144, the size field of the header 142 has a value of zero. In some implementations, the payload 144 of the packet 140 contains a return address. For example, if a packet is a read request, the return address for any data to be read may be contained in the payload 144.

Figure 6:
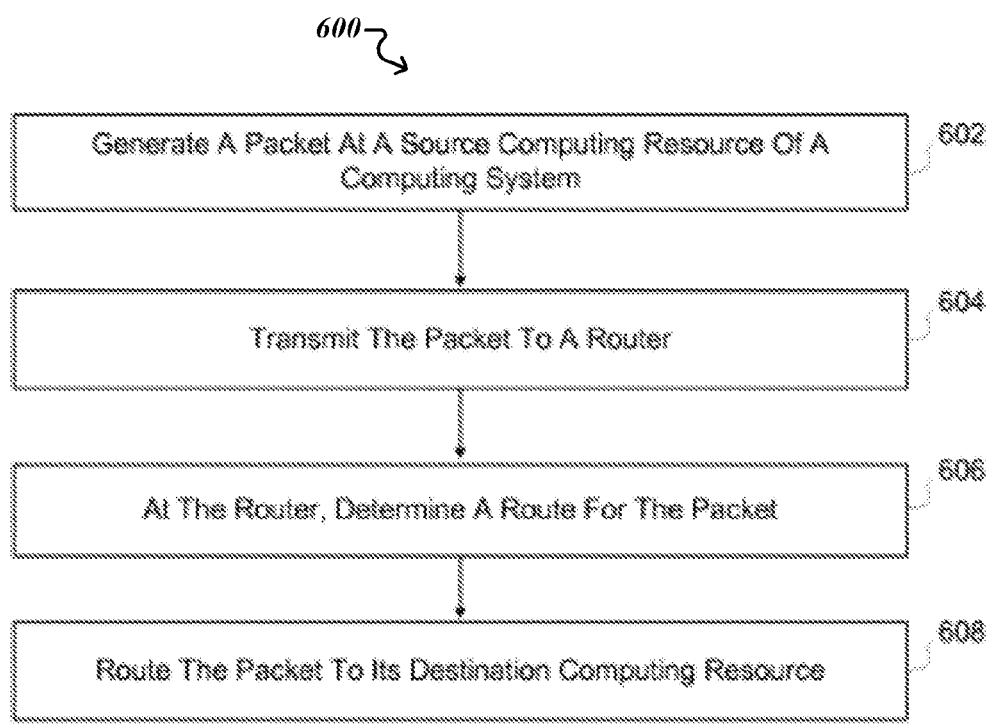
FIG. 6 is a flow diagram showing an example of a process of addressing a computing resource of a computing system using a packet.

FIG. 6 is a flow diagram showing an example of a process 600 of addressing a computing resource of a computing system using a packet in accordance with network on a chip architecture. An implementation of the computing system 100 may have one or more processing devices 102 configured to execute some or all of the operations of the process 600 in response to instructions stored electronically on an electronic storage medium. The one or more processing devices 102 include one or more devices configured through hardware, firmware, and/or software to execute one or more of the operations of the process 600.

The process 600 may start with block 602, at which a packet is generated at a source computing resource of the computing system 100. The source computing resource may be, for example, a device controller 106, a cluster controller 118, a super cluster controller 132 if a super cluster is implemented, an AIP 114, a memory controller for a cluster memory 118, or a processing engine 120. The generated packet may be the packet 140 described above in connection with FIG. 5. From block 602, the exemplary process 600 may continue to the block 604, where the packet is transmitted to an appropriate router based on the source computing resource that generated the packet. For example, if the source computing resource is a device controller 106, the generated packet is transmitted to a top level router 104 of the local processing device 102; if the source computing resource is a cluster controller 116, the generated packet is transmitted to a router 112 of the local cluster 110; if the source computing resource is a memory controller of the cluster memory 118, the generated packet is transmitted to a router 112 of the local cluster 110, or a router downstream of the router 112 if there are multiple cluster memories 118 coupled together by the router downstream of the router 112; and if the source computing resource is a processing engine 120, the generated packet is transmitted to a router of the local cluster 110 if the destination is outside the local cluster and to a memory controller of the cluster memory 118 of the local cluster 110 if the destination is within the local cluster.

At block 606, a route for the generated packet is determined at the router. As described above, the generated packet includes a header that includes a single destination address. The single destination address is any addressable location of a uniform memory space of the computing system 100. The uniform memory space is an addressable space that covers all memories and registers for each device controller, cluster controller, super cluster controller if a super cluster is implemented, cluster memory and processing engine of the computing system 100. In some cases, the addressable location is part of a destination computing resource of the computing system 100. The destination computing resource may be, for example, another device controller 106, another cluster controller 118, a memory controller for another cluster memory 118, or another processing engine 120, which is different from the source computing resource. The router that received the generated packet determines the route for the generated packet based on the single destination address. At block 608, the generated packet is routed to its destination computing resource.

Figure 7A:
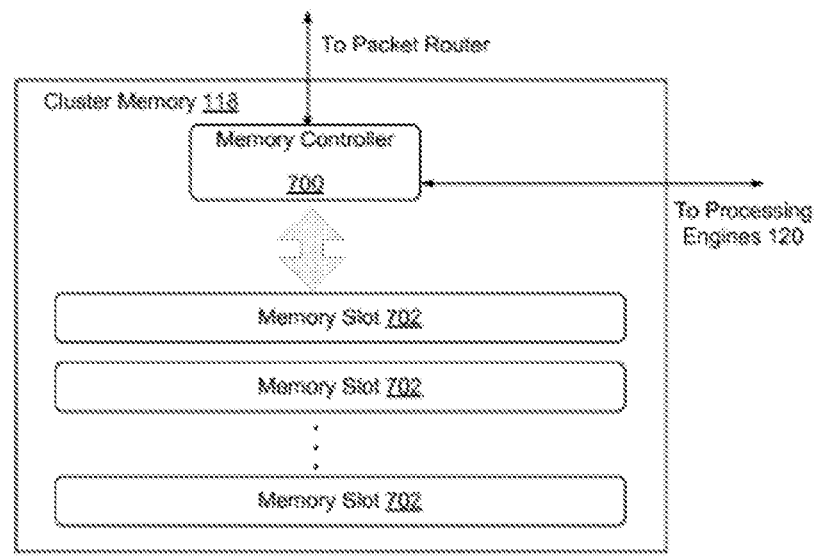
FIG. 7A is a block diagram of an example of a cluster memory.

FIG. 7A is a block diagram of an example of cluster memory 118 of a cluster of a computing device. The cluster memory 118 includes a memory controller 700 and a plurality of memory slots 702. The memory controller 700 may also be referred to as a cluster memory controller to distinguish it from other memory controllers in a processing device 102; for example, a memory controller for a processing engine 120, or a memory controller for a device controller 106.

In the example shown in FIG. 7A, the memory controller 700 is coupled to a packet router and to processing engines 120 via different data links. In implementations which have one cluster memory 118 within a cluster 110, the memory controller 700 is coupled to the router 112 of the cluster 110. The memory controller 700 may also be referred to as a smart memory controller because it implements two different access protocols: by packet access and direct memory access.

In some implementations, the data link between the memory controller 700 and a router is a packet-based data communication. The packet-based data communication uses packets as described above, e.g., such as the packet 140 shown in FIG. 5. In some implementations, the data link between the memory controller 700 and processing engines 120 is a direct data communication. Here, the processing engines 120 coupled to the memory controller 700 are the plurality of processing engines 120 within the same cluster 110 and the direct data communication includes memory access techniques. Examples of existing memory access technologies that may be used for the direct data communication between the memory controller 700 and the plurality of processing engines 120 within the cluster 110 include bus, crossbar, or any other existing memory access techniques for a network on a chip architecture.

The memory slots 702 are slots configured to receive memory banks and are configured for memories such as synchronous dynamic random-access memory (SDRAM), double data rate (DDR) SDRAM, DDR2 SDRAM, DDR3 SDRAM, or 3D RAM.

Figure 7B:
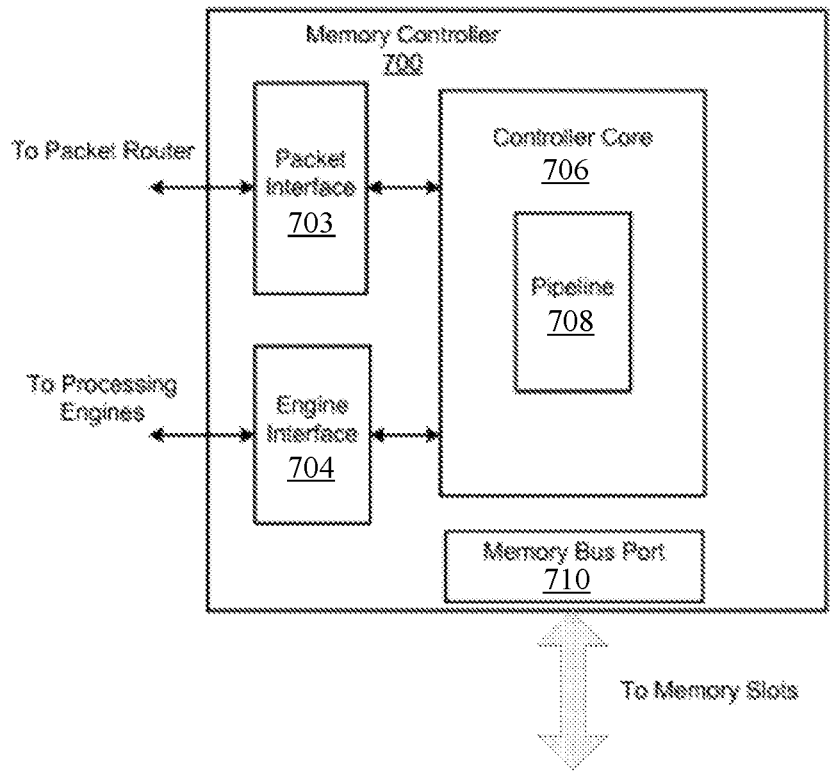
FIG. 7B is a block diagram of an example of a memory controller of a cluster memory.

FIG. 7B is a block diagram of an example memory controller 700 for a cluster memory 118. Here, the memory controller 700 includes a packet interface 703, an engine interface 704, control circuitry 706 and a memory bus port 710. The engine interface 704 is configured to support direct memory access by the processing engines 120 within the cluster 110. As such, the engine interface 704 implement part or all features of access technologies, such as but not limited to include bus, crossbar, or any other memory access techniques for a network on a chip architecture. The packet interface 703 includes hardware components configured to receive and transmit packets to a router. In some implementations, the packet interface 703 include a queue to buffer received packets and another queue to buffer packets to be sent. Once a packet is received at the packet interface 703, it is forwarded to the control circuitry 706 for processing. The memory bus port 710 is a data connection port configured to couple the memory controller 700 to the memory slots 702.

The control circuitry 706 (also referred to as controller core) is configured to decode a received packet, perform a memory operation (if required by the packet opcode), and generate a result packet (if necessary). For example, if a received packet has a packet opcode for a memory write, the control circuitry 706 extracts data from the received packet and writes the data to the memory bank at an address specified in the packet. Likewise, if a received packet has a packet opcode for a memory read, the control circuitry 706 reads data from the memory address specified in the packet, places the data in a new packet with a destination address specified in the read packet, and sends the new packet to the packet interface 703 to be queued for transmission. In some implementations, the control circuitry 706 has a structure similar to a typical CPU. For example, the control circuitry 706 includes an optional pipeline 708 to perform the steps of decoding the packet, performing the memory operation, and generating a result packet.

Figure 8:
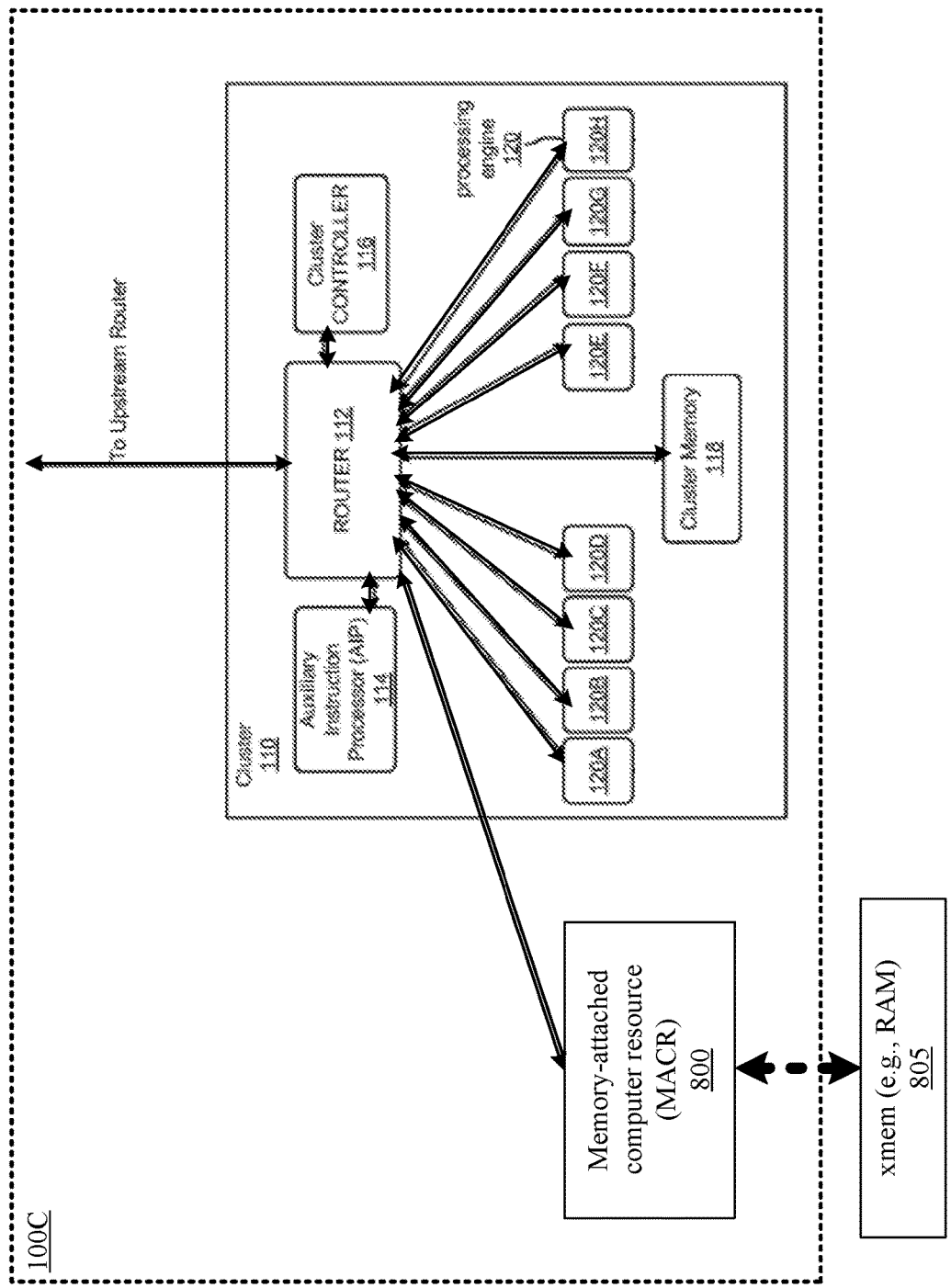
FIG. 8 shows a portion of a computing system including a computing resource attached to external memory.

FIG. 8 shows a portion of a computing system 100C including a plurality of computing resources that communicate with each other via packets (e.g., like the data packets 140 described above in connection with FIG. 5) in accordance with a network on a chip architecture. In some implementations, the computing resources of the computing system 100C are disposed on a single chip. Packet-based communication pathways between the computing resources of the computing system 100C are represented in FIG. 8 by double-line arrows. Router 112 (e.g., like the one described above in connection with FIG. 3A) and other higher level routers (not shown in FIG. 8) route packets between the computing resources of the computing system 100C. The plurality of computing resources of computing system 100C includes processing engines 120 (e.g., 120A, 120B, . . . , 120H), AIP 114, cluster controller 116 (e.g., like the ones described above in connection with FIGS. 3A and 4), and a memory controller of cluster memory 118 (e.g., like the one described above in connection with FIGS. 7A-7B), for instance.

Note that the cluster memory 118 included in computing system 100C is typically of order 100s KB. In contrast, external memory 805 associated with the computing system 100C can be of order 1 GB, 10 GB, 100 GB, or more. The external memory 805 can be RAM, solid-state drive (SSD) or other storage device. In the example illustrated in FIG. 8, the computing system 100C also includes a memory-attached computing resource 800 that interfaces with the other computing resources of the computing system via packets (e.g., the data packets 140 described above in connection with FIG. 5), in accordance with a network on a chip architecture, and with the external memory 805 via an external memory interface. The external memory interface is a communication protocol, denoted in FIG. 8 by a dashed-arrow, generally used by data processing circuitry to access memory that is external to the data processing circuitry. In most cases, the external memory interface is defined in terms of specific signal lines associated with the external memory 805 being accessed, and timing used for those signal lines (e.g., as defined in JEDEC JESD-79 standards for various types of DDR DRAM).

When a packet transmitted along any of the packet-based communication pathways reaches any one of the processing engine 120, the AIP 114, the cluster controller 116 or the memory controller of cluster memory 118, the recipient computing resource decodes the packet, and then software executing on the recipient computing resource uses information decoded from the packet to control the recipient computing resource. When a packet routed by router 112 along a packet-based communication pathway reaches the memory-attached computing resource 800, the packet is decoded by the memory-attached computing resource, and information decoded from the packet is used by the memory-attached computing resource to read data from the memory 805 and operate on the read data prior to either writing the operated on data back to the memory, or transmitting the operated on data to one or more of the other computing resources (e.g., 120, 114 or 116), or both.

Figure 9:
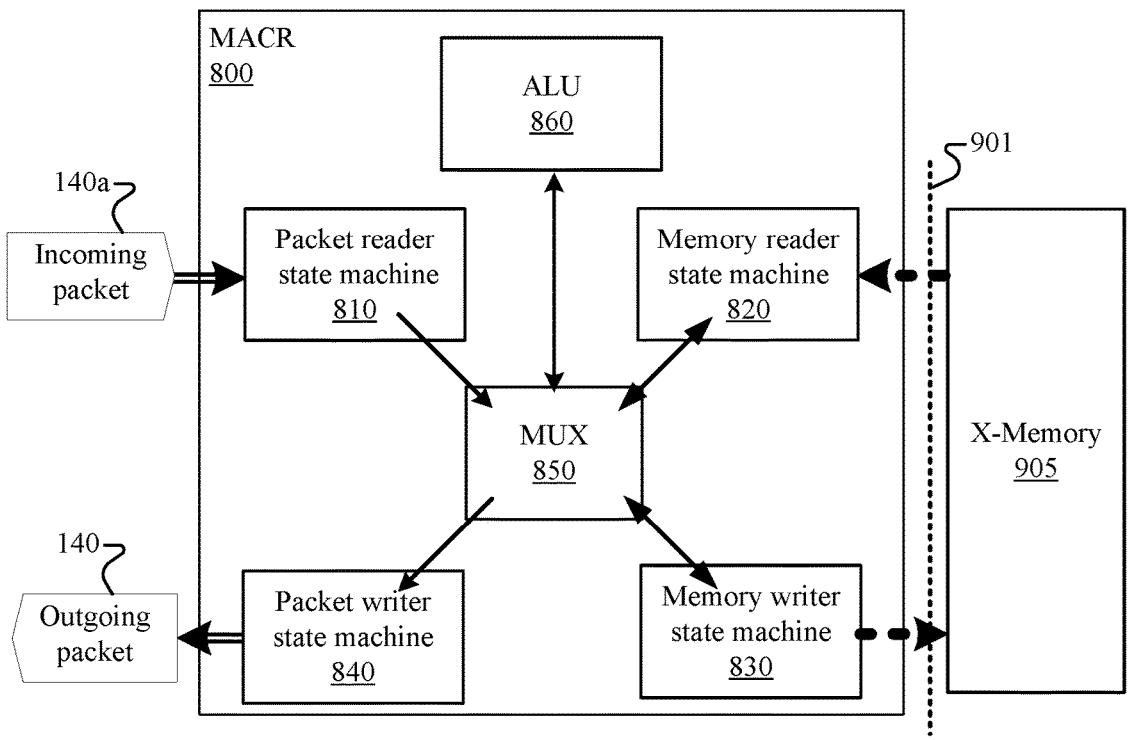
FIG. 9 shows an example of a memory-attached computing resource.

FIG. 9 shows an example implementation of a memory-attached computing resource 800 that interfaces with other computing resources of a computing system (e.g., computing system 100C) via packets 140a, 140, in accordance with a network on a chip architecture, and with external memory 905 via external memory interface 901. The external memory interface 901 is represented in FIG. 9 as a dotted-line crossed by a pair of opposing dashed-arrows.) In some implementations, the memory-attached computing resource 800 includes a packet reader state machine 810, a memory reader state machine 820, a memory writer state machine 830, a packet writer state machine 840, a multiplexer (MUX) 850 and an arithmetic logic unit (ALU) 860. In other implementations of the memory-attached computing resource 800, the packet writer state machine 840 can be omitted. In yet other implementations of the memory-attached computing resource 800, the memory writer state machine 830 can be omitted.

The packet reader state machine 810, also simply referred to as the packet reader 810, is configured to parse incoming packets 140a received by the memory-attached computing resource 800 through a packet-based communication pathway. The memory reader state machine 820, also simply referred to as the memory reader 820, is configured to read data from the memory 905 through the external memory interface 901. The memory writer state machine 830, also simply referred to as the memory writer 830, is configured to write data to the memory 905 through the external memory interface 901. The packet writer state machine 840, also simply referred to as the packet writer 840, is configured to generate outgoing packets 140 to be transmitted by the memory-attached computing resource 800 through a packet-based communication pathway. Note that each of the state machines 810, 820, 830 and 840 is circuitry formed from an associated set of gates to be configured based on parameters loaded in corresponding registers of the memory-attached computing resource 800. In this manner, each of the state machines 810, 820, 830 and 840 performs its respective task (packet parsing, memory reading, memory writing, packet generating) without use of software instructions (or code). The parameters loaded in the noted registers are provided to the memory-attached computing resource 800 via the incoming packet 140a and loaded to appropriate registers once the packet reader state machine 810 completes parsing the incoming packet.

Moreover, the MUX 850 is configured to move data between the state machines 810, 820, 830 and 840 either through or bypassing the ALU 860, and the ALU is configured to operate on data provided by the MUX. Note that the MUX 850 can be configured based on sets of code for corresponding operations, as described below in this specification. Further, the ALU 860 is circuitry formed from a set of gates that can be configured, e.g., based look up tables (LUTs), as described below in this specification. In some implementations, the ALU 860 circuitry is formed from another set of gates that can be configured to perform Bit Matrix operations.

In this manner, when an incoming packet 140-a is received by the memory-attached computing resource 800, the packet reader 810 decodes the received incoming packet into state machine parameters including (i) a read memory address of the memory 905, and (ii) one or more operational codes. The decoded memory address is loaded in a register associated with the memory reader 820, which causes the memory reader to read data from the memory address and to load the read data as a first operand in a read register associated with the memory reader. In some implementations, another state machine parameter decoded by the packet reader 810 that is related to a write memory address of the memory 905 is loaded to a register associated with the memory writer 830, which causes the memory writer to write a result of an operation to be performed by the ALU 860 to the write memory address. In some implementations, yet another state machine parameter decoded by the packet reader 810 that is related to a destination address is loaded to a register associated with the packet writer 840, which causes the packet writer to generate a notification packet to be transmitted by the memory-attached computing resource 800 to notify a notification target computing resource having the destination address that a result of the operation to be performed by the ALU 860 is available in the memory 905, or to provide the result of the operation to be performed by the ALU to a destination computing resource having the destination address.

Moreover, the one or more operational codes and/or yet other state machine parameters decoded by the packet reader 810 are loaded to respective registers associated with the MUX 850, which causes the MUX to route (i) the first operand from the memory reader 820 to the ALU 860, and (ii) the result of the operation to be performed by the ALU to either the memory writer 830, or the packet writer 840, or both. The foregoing routing applies for unary operations to be performed by the ALU 860, e.g., not, inc, dec, zbuf, cancel. In some cases in which the ALU 860 is to perform binary operations, e.g., rotate, add, sub, and, or, xor, one of the state machine parameters decoded by the packet reader 810 is loaded in another register associated with the memory reader 820, which causes the memory reader to read additional data from the memory address and to store the additional read data as a second operand in a second read register associated with the memory reader. In this case, the MUX 850 further routes the second operand from the memory reader 820 to the ALU 860. In other cases in which the binary operations to be performed by the ALU 860 are conditional (or predicated) operations, data from the incoming packet 130a is loaded to a register associated with the packet reader 810 as a third operand. In this case, the MUX 850 further routes the third operand from the packet reader 810 to the ALU 860.

Example implementations of the incoming packet 140a, along with example implementations of the memory-attached computing resource 800 and examples of use cases of the memory-attached computing resource are described next.

Figure 10A:
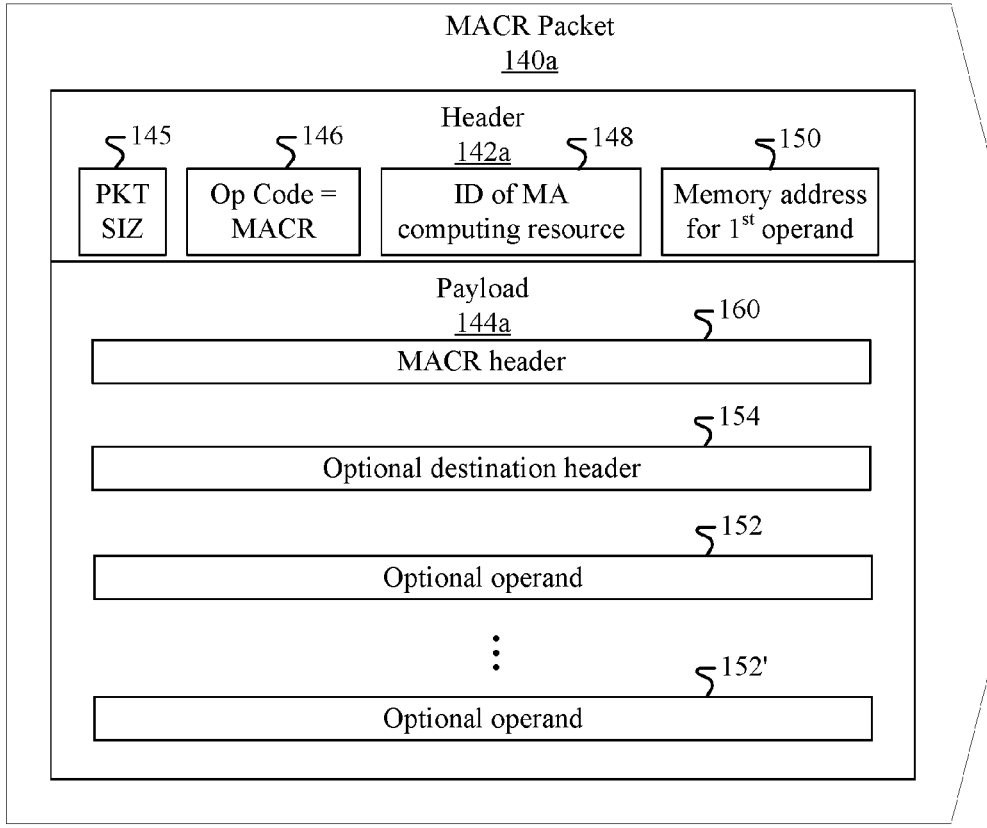
FIGS. 10A-10B show aspects of a packet received by a memory-attached computing resource.

FIG. 10A shows an incoming packet 140a—received by the memory-attached computing resource 800 through a packet-based communication pathway—that is implemented as a memory-attached computing resource (MACR) packet. The MACR packet 140a has a header 142a and a payload 144a. The payload 144a includes a MACR header 160 which carries parameters used to configure at least the packet reader 810, the memory reader 820, the memory writer 830, the packet writer 840 and the MUX 850. A format of the MACR header 160 is described below in connection with FIG. 10B. In some cases, the payload 144a can include a destination header 154 to be used by the packet writer 840 to generate an outgoing packet 140 to carry a result of operations carried out by the ALU 860 to a destination computing resource of the computing system 100C. A format of the outgoing packet 140, including a format of the destination header 154, has been described above in connection with FIG. 5. In some cases, an operation to be performed by the ALU 860 on a first operand, which is data stored in the memory 905, requires a second operand or even a third operand. In such cases, the payload 144a can include data corresponding to one or more instances of the second operand 152 and data corresponding the third operand 152'. The header 142a includes at least payload size information 145, an opcode 146 and an ID 148 of the memory-attached computing resource 800. Further, the header 142a includes a memory address 150 of the memory 905 where data corresponding to the first operand is stored. The ID 148 and the memory address 150 can be provided in any of the forms described above in connection with FIG. 5. Here, a value of the payload size 145 can be a number of longwords corresponding to the total data in the payload 144a. In some implementations, the opcode 146 can have a value—corresponding to a "MACR operation"—that notifies the memory-attached computing resource 800 that the payload 144a includes a MACR header 160 to be parsed by the packet reader 810.

Figure 10B:
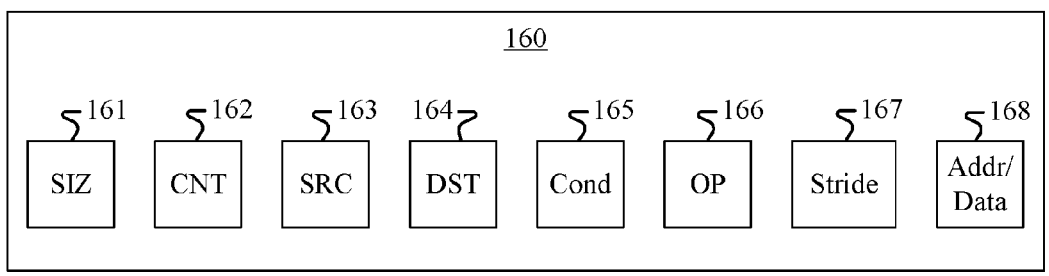

FIG. 10B shows the format of the MACR header 160. The fields of the MACR header 160 are listed below in Table 1.

TABLE 1

| Numerical reference | Field name | Size (bits) | Values/description |
|---|---|---|---|
| 161 | SIZ | 4 | Size of data item(s) stored in memory 905 to be operated on; This is encoded as base-2 logarithm of size in 8-bit bytes/octets (minus 1). So, 0→1 byte, 1→2 bytes, 2→4 bytes, 3→8 bytes, 4→16 bytes, 5→32 bytes, etc. |
| 162 | CNT | 8 | Count of data items stored in memory 905 to be operated on. |
| 163 | SRC | 1 | Location of second operand: 0 = Data in memory 905 (at address specified in Addr 168); 1 = Data in MACR packet 140a: If data size <=32 bits, then data is in Addr field 168 itself, otherwise, data 152 is in payload 144a. |

TABLE 1-continued

| Numerical reference | Field name | Size (bits) | Values/description |
|---|---|---|---|
| 164 | DST | 2 | Bitmask: 1 bit each for memory 905 or outgoing packet 140; either or both can be set to specify where a result goes. |
| 165 | COND | 4 | Condition used in conditional operation: e.g., always, =, <, >, !=, FP<, FP>, select lesser, select greater, etc. |
| 166 | OP | 5 | Opcode corresponding to atomic operation to be performed by ALU 860: E.g., AND, OR, XOR, SWAP, INC, DEC, ADD, SUB, POPCNT, ROTL, ROTR, ASL, ASR, LSR, WRITE, TESTS, FFCS, FFSC, Search, Watch, Cancel, etc. |
| 167 | Stride | 8 | Stride in memory space between data items stored in memory 905 to be operated on; encoded as the count of data items of size SIZ between addresses to be written. |
| 168 | Addr/Data | 32 | Address or data of second operand: When SRC = 0, this contains an address. When SRC = 1 & data size <=32 bits, contains data. When SRC = 1 and data size >32 bits, this is ignored, and data 152 is in payload 144a. |

Note that the total size of the MACR header 160 is 64 bits. With respect to the SIZ field 161, multiple 64-bit operands can be specified for operands that do not require interaction between bits. In such cases, higher bits can be set to 0 and ignored. With respect to the Addr field 168, it signifies an offset within the memory 905 directly visible to computing resources (e.g., processing engines 120) of a particular cluster (e.g., cluster 110) of the computing system 100C. Since there can be 32 clusters in the computing system 100C and addressing is in 32-bit words, the 32-bit Addr field 168 is sufficient for addressing up to 4 Gigawords per cluster or 128 Gigawords per computing device 102 (where a "word" includes 32-bits). In some implementations, some high bits of the Addr field 168 can be set to 0 and ignored. With respect to the Stride field 167, it is specified in terms of SIZ. So, if SIZ=64 and Stride=2, then 128 bits are skipped between successive data items in memory 905, in other words, every third 64-bit data item would be read/written in this case.

With respect to the COND field 165, a condition combined with a binary operation uses three operands (e.g., combine first two operands and compare the result with third operand). In this case, the first two operands are accessed based on (i) the memory address 150 and (ii) SRC field 163. The third operand always comes from the received MACR packet 140a. Moreover, note that the MUX 850 applies the condition specified by the COND field 165 after the operation is performed by the ALU 860 (i.e., the condition applies to a result of the operation). If the condition is not met, that result is discarded. If the condition is met, the result is written to the specified destination(s), e.g., back to the memory 905 and/or to an outgoing packet 140 to be sent to another of the computing resources (e.g., a processing engine 120) of the computing system 100C. If the result destination, according to the DST field 164 is both the memory 905 and the outgoing packet 140, then, (i) for non-conditional operations, data values read from the memory 905 are modified, and the modified values are written back to the memory and into the outgoing packet 140, or (ii) for conditional operations (e.g., add 3 if result is <10), all the result values are written to the outgoing packet, including those that have not been updated to the memory because they had not satisfied the condition.

In addition to the atomic operations indicated in Table 1 in connection with the OP field 166, the memory-attached computing resource 800 shown in FIG. 9 can perform read and write operations relating to the memory 905 that are not accompanied by additional operations performed by the ALU 860. In some implementations, such read and write operations can be specified in respective read packets and write packets, as described above in connection with FIG. 5. Such read packets and write packets do not include the MACR header 160 in their payload. In other implementations, such read and write operations can be specified—in the MACR header 160 included in the payload 144a of a MACR packet 140a—by respective READ and WRITE values of the OP field 166. Additionally, in either of the foregoing implementations, the memory-attached computing resource 800 can be configured to count a number of read packets and/or write packets that pass through the MUX 850.

Other operations that can be performed by the memory-attached computing resource 800 shown in FIG. 9 are searching and scanning of the memory 905, tallying data types that have been written to a region of the memory, filling the memory with a specific value, transferring direct memory access (DMA) blocks of the memory to any of the computing resources (e.g., processing engine 120) of the computing system 100C, etc.

Figure 11:
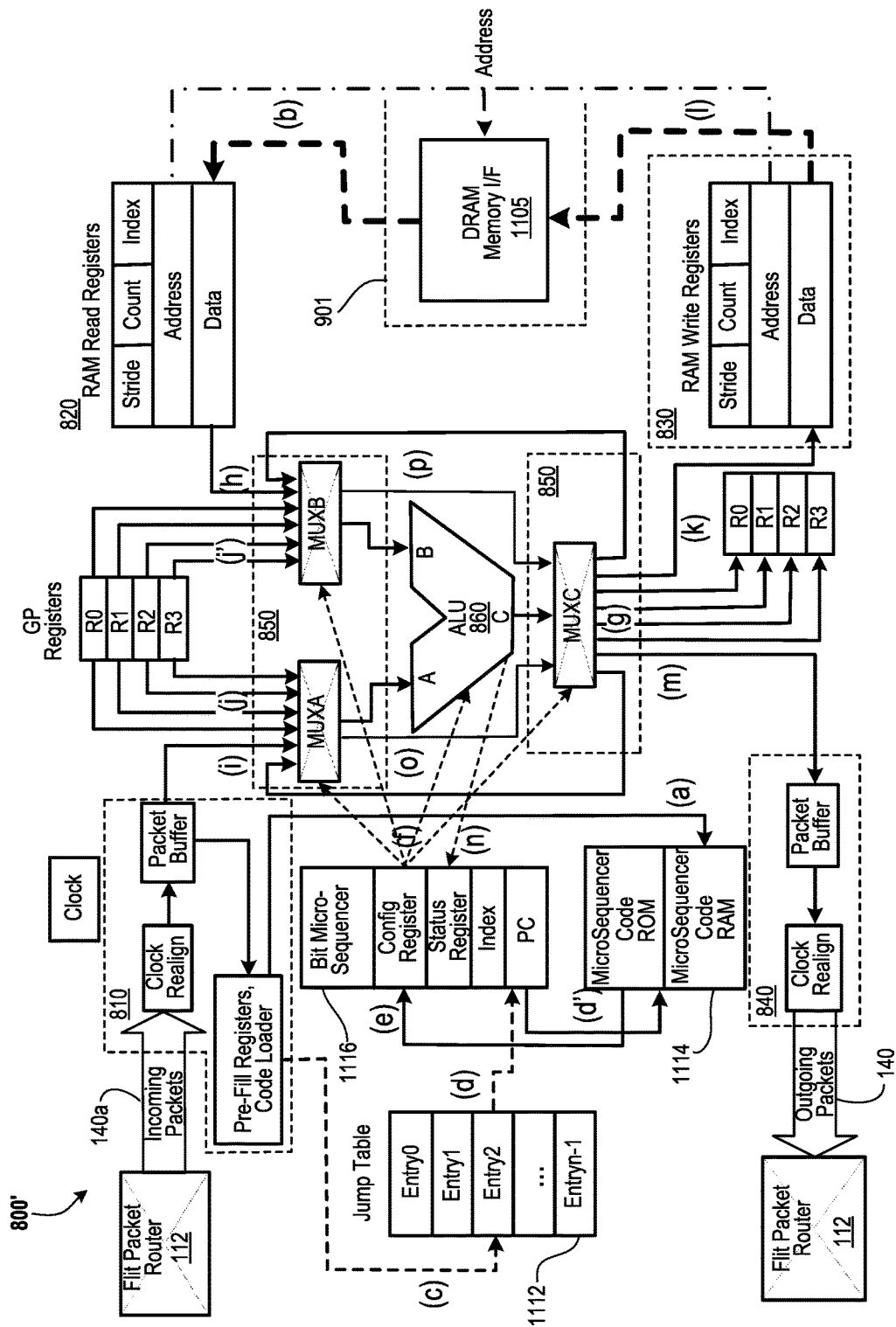
FIG. 11 shows an example implementation of a memory-attached computing resource that uses a jump table and a code store.

FIG. 11 shows an implementation of a memory-attached computing resource 800' that uses a jump table 1112 and a code store 1114. Here, the memory-attached computing resource 800' interfaces with a packet router 112 (e.g., of the computing system 100C) in accordance with a network on a chip architecture, and with external memory 1105 (e.g., DRAM) via external memory interface 901. Incoming packets received by the memory-attached computing resource 800' through packet-based communication pathway are MACR packets 140a as described above in connection with FIGS. 10A-10B. Outgoing packets 140 transmitted by the memory-attached computing resource 800' through the packet-based communication pathway have been described above in connection with FIG. 5. The memory-attached computing resource 800' includes a MUX 850, an ALU 860, the jump table 1112, the code store 1114, a micro-sequencer 1116, and a plurality of registers. Note that the packet reader state machine 810, the memory reader state machine 820, the memory writer state machine 830, and the packet writer state machine 840 described above in connection with FIG. 9 encompass corresponding sets of registers from among the plurality of registers of the memory-attached computing resource 800'.

The memory-attached computing resource 800' extracts one or more opcodes from incoming MACR packets 140a and branches to appropriate code in the code store 1114 through the jump table 1112. The micro-sequencer 1116 directs, based on the code in the code store 1114, (i) the MUX 850 to move data (a) from incoming MACR packets 140a, (b) from and to the memory 1105, and (c) to outgoing packets 140, and (ii) the ALU 860 to perform arithmetic/logic operations on the moved data.

Here, the ALU 860 includes input ports A and B, and output port C. Examples of operations that can be performed by the ALU 860 of the memory-attached computing resource 800' are listed below in Table 2.

TABLE 2

| OP 166 | Operation | Description | Operand(s) | LUT OP | Return value |
|---|---|---|---|---|---|
| 0 | NOP | No operation | | | |
| 1 | MOVA | Move A input to C output | | | |
| 2 | MOVB | Move B input to C output | | | |
| 3 | ZERO | Zero the output value | | Y | |
| 4 | MAXS (or MAXF) | Select larger of two integers (or two floats) | | | |
| 5 | OR | C = A OR B | | Y | |
| 6 | AND | C = A AND B (logical read/modify/write memory instruction) | Addr 150, AND value, CNT 162 | Y | None |
| 7 | XOR | C = A XOR B (logical read/modify/write memory instruction) | Addr 150, XOR value, CNT 162 | Y | None |
| 8 | NOT | C = !A | | Y | |
| 9 | LROT | Logical rotate A by amount B (logical read/modify/ write memory instruction) | Addr 150, # bits, CNT 162 | | None |
| 10 | CMPS (or CMPF) | Signed integer (or floating) compare of A and B; result is set to status bits in status register | | | |
| 11 | READ | Read from memory 1105 | Addr 150, Stride 167, CNT 162 | | None |
| 12 | WRITE | Write to memory 1105 | Addr 150, Stride 167, CNT 162 | | None |
| 13 | ADDLIM | Read location in memory 1105; If below a certain limit value add and then put back. | Addr 150, increment | | New value |
| 14 | MINI (or MINF) | Read value from memory 1105, compare to Arg, if Arg is LT read value, then replace | Addr 150, Arg | | |
| 15 | MAXI (or MAXF) | Read value from memory 1105, compare to Arg, if Arg is GT read value, then replace | Addr 150, Arg | | |
| 16 | CSWAPGF aka ZBUF (or CSWAPGI) | Compare two float values (or signed integers) and swap if value at Addr1 < value at Addr2 | Addr1 150, Addr2 168 | | |
| 17 | FFSC | Find first set bit and clear, returning bit position. | Addr 150, range | | Bit position |
| 18 | FFCS | Find first clear bit and set, returning bit position. | Addr 150, range | | Bit position |
| 19 | FINDS | Find substring in a string. | Addr 150, range, Srch str | | Position |
| 20 | SWAP | Swap two longwords | Addr1 150, Addr2 168 | | Position |
| 21 | TESTS | Test and set flag or bit value. | Addr 150, bitnum | | True, false |
| 22 | FILL | Fills block of memory with a given longword | CNT 162, Addr 150, fill | | None |
| 23 | WATCH | Sets watch area in memory between AddrLo and AddrHi | AddrLo, AddrHi | | None |

Note that operations from Table 2 for which column LUT OP has been checked are operations to be performed in a LUT which can be downloaded to the memory-attached computing resource 800' by a user, e.g., through an incoming MACR packet 140*a*.

For the FINDS operation, the string to search for can be encoded in the following way. If CNT>0, then CNT field 162 specifies the length of the string to search for. If CNT=0, the string is expected to be encoded as a 32-bit word specifying the string length, followed by that number of characters of string data. Alternatively, CNT=0 could signify a string terminated by a NUL character (a character with all bits set to 0). The SIZ field 161 specifies the size of each code unit in the string (typically expected to be 8 for ASCII/ISO 8859/UTF-8, 16 for UTF-16, or 32 for UCS-4/UTF32). The result is the address at which the match was found, encoded as an address 150 of a packet header. If no match is found, some otherwise-illegal address (such as all bits set to 1) can be returned.

For the WATCH operation, the memory-attached computing resource 800' watches and flags an error if a WRITE operation writes data outside of a region of the memory 1105 specified by the watch points AddrLo and AddrHi. In this manner, the memory-attached computing resource 800' can signal not only completion of an operation but also an error occurring during or as a consequence of the operation.

Referring again to FIG. 11, examples of the plurality of registers included in the memory-attached computing resource 800' are listed below in Table 3.

TABLE 3

| Register name | Associated component | Load @ t = 0 | Description |
|---|---|---|---|
| COFF | Sequencer 1116/MUX 850 | Y | Code Offset Register—points to code in program memory |
| RWCFG | Memory writer 830 | Y | RAM write configuration register: Stride-0:15, CNT: 16:23, Index: 24:31 |
| RWADR | Memory writer 830 | Y | RAM write address register |
| RRCFG | Memory reader 820 | Y | RAM read configuration register: Stride-0:15, CNT: 16:23, Index: 24:31 |
| RRADR | Memory reader 820 | Y | RAM read address register |
| CFR | Sequencer 1116/MUX 850 | Y | Configuration register-sets up MUX 850 etc. |
| RRDAT | Memory reader 820 | | RAM read data register |
| RWDAT | Memory writer 830 | | RAM write data register |
| PWR | Packet writer 840 | | Packet Write register |
| SR | Sequencer 1116/MUX 850 | | Status register |
| R0, R1, R2, R3 | | | General purpose registers |
| OUTPKT (0 . . .) | | | Output packet registers |
| MEMCHKLO | | | Memory check low range |
| MEMCHKHI | | | Memory check high range |

Note that the registers listed in Table 3 for which column "Load @ t=0" has been checked are registers that are loaded with state machine parameters and opcodes extracted from an incoming MACR packet 140*a*.

As indicated above in Table 3, the status register SR is associated with the micro-sequencer 1116 that controls the MUX 850. The status register SR can be used when the ALU 860 performs conditional operations and has entries like the ones listed in Table 4.

TABLE 4

| Entry | Bit # | Description |
| --- | --- | --- |
| ZERO | 0 | ALU 860 compares == 0 |
| AGTB | 1 | ALU 860 compares values at A input port and B input port of ALU: A > B |
| AEQB | 2 | ALU 860 compares A = B |

Note that some of the operations listed in Table 2 are conditional operations, and can also be referred to as predicated operations. Examples of predicates are less than, less than or equal to, equal, greater than or equal to, greater than, etc. Contrary to most assembly languages, for the disclosed technologies conditions are evaluated based on the result of the current operation. That is, in conventional assembly language, conditions are evaluated based on the current contents of the status register SR, e.g., arithmetic/logic operations update the status register SR. For the disclosed technologies, each operation is performed, then the result is written back to the memory 1005 if and only if the predicate is met with respect to the result of performing the current operation. Note that, along with a specification of a condition, each predicate can include an operand of its own.

The foregoing way to perform predicated operations allows the memory-attached computing resource 800' to specify some operations, e.g., MAXI, MINI, MAXF, MINF, as a write with a condition. For example: the operation MINI can be specified as the following sequence of opcodes and operands: MINI→WRITE value, location, less. As another example, the operation MAXI can be specified as the following sequence of opcodes and operands: MAXI→WRITE value, location, greater. As yet another example, the operation ADDLIM can be specified as the following sequence of opcodes and operands: ADDLIM→ADD value, location, less, limit.

In addition, all operations listed in Table 2 can also include CNT, SIZ and Stride as well. However, if a data source has less data (as specified by the SIZ field 161 in the MACR header 160) than implied by the combination (CNT, SIZ), then the data of the data source is repeated as needed. For example, to fill 100 longwords of the memory 1005 starting from address 0x1234 with the value 0, the following sequence of opcodes and operands could be used: WRITE 0, 0x1234, 100. Note, though, that this "fill operation" should be the last operation included in a chained MACR packet 140a.

Referring again to Table 3, the configuration register CFR also is associated with the micro-sequencer 1116 that controls the MUX 850. The configuration register CFR can be used to set up the MUX 850, for instance, and has entries like the ones listed below in Table 5.

TABLE 5

| Entry | Bit # | Description |
| --- | --- | --- |
| MUXA | | MUX control bits relating to configuration of MUX portion controlling input port A of ALU 860 |
| MUXB | | MUX control bits relating to configuration of MUX portion controlling input port B of ALU 860 |
| MUXC | | MUX control bits relating to configuration of MUX portion controlling output port C of ALU 860 |
| CLK | | Control bits of clock source associated with packet reader 810 and packet writer 840 |
| SENDPKT | | Bit to trigger a packet send from output packet buffer associated with packet writer 840 |

Moreover, the jump table 1112 includes pointers associated with predefined opcodes OP 166 (also referred to as preconfigured opcodes) listed in the first column of Table 3, and the code store 1114 includes entries associated with operation configurations corresponding to the predefined opcodes OP 166. An operation configuration corresponding to a predefined opcode includes a set of bits (e.g., 011101111 . . . 0011011100) used to set gates of the MUX 850, and/or gates of the ALU 860 to implement an operation to which the predefined opcode belongs. In this manner, an entry associated with the predefined opcode in the jump table 1112 is uniquely mapped to an entry associated with the corresponding operation configuration in the code store 1114. Note that the micro-sequencer 1116 can be used to single step through one or more operation configurations in the code store 1114 for debugging purposes.

Some of the entries in the jump table 1112 can be left empty, so they can be filled when desired with opcodes of custom operations, to be defined, e.g., by a user at a later time. For instance, a portion of the code store 1114 that includes entries associated with operation configurations corresponding to preconfigured opcodes OP 166 can be stored in read-only-memory (ROM), while another portion of the code store that includes entries associated with operation configurations corresponding to user-defined opcodes OP 166 can be stored in read-write-memory. To add a new opcode, the memory-attached computing resource 800' can receive a new operation configuration corresponding to the new opcode in an incoming packet. The newly received operation configuration is then loaded (via path (a) shown in FIG. 11) as a new entry into the code store 1114. Also, a new pointer that points to the new entry of the code store 1114 is added to the jump table 1112. Note that the new operation configuration includes (I) information on how to parse a MACR packet 140a that includes the new opcode OP 166, (II) configuration information to preload corresponding ones of the registers of the memory-attached computing resource 800', and (III) step-by-step configuration register calls to perform the operation to which the new opcode belongs.

Referring again to FIG. 11, in response to receiving an incoming MACR packet 140a by the memory-attached computing resource 800', the packet reader 810 extracts state machine parameters and an opcode OP 166 from the received MACR packet. In this manner, the Address of first operand 150 from the header 142a of the received MACR packet 140a is loaded to register RRADR associated with the memory reader 820 (and optionally to register RWADR associated with the memory writer 830); and the set of Stride 167, CNT 162 and SIZ 161 from the MACR header 160 included in the received MACR packet 140a is loaded to register RRCFG associated with the memory reader 820 (and optionally to register RWCFG associated with the memory writer 830). As such, the memory reader 820 loads data—read (via path (b) shown in FIG. 11) from the memory 1105 in register RRDAT associated with the memory reader—to be used as first operand by the ALU 860. Additionally, the destination header 154 included in the received MACR packet 140a is optionally loaded to register PWR associated with the packet writer 840.

Extracted opcode OP 166 is matched (via path (c)) to its associated entry in jump table 1112. A pointer from the entry associated with the opcode in jump table 1112 points (via paths (d+d')) that include a program counter (PC) of the micro-sequencer 1116) to a corresponding entry in code store 1114. The operation configuration from the code store 1114 selected in this manner is loaded (via path (e)) to register CFR. Appropriate portions of the operation configuration loaded in register CFR are used to appropriately configure (via paths (f)) various portions of the MUX 850 and the ALU 860, so an arithmetic/logic operation, to which the opcode associated with the operation configuration belongs, can be performed.

In some implementations, general purpose (GP) registers R0, R1, R2 and R3 can be used (via one of paths (g)) to hold intermediary results generated by ALU 860. In some implementations, if either SRC 163 from the MACR header 160 included in the received MACR packet 140*a* is set to 1, and/or a conditional operation is to be performed by ALU 860, the packet reader 810 can extract payload data so it can be loaded as second operand and/or as third operand, respectively, in corresponding GP registers.

In this manner, the ALU 860 can operate on (i) first operand provided (via path (h)) by the MUX 850 from register RRDAT associated with the memory reader 820, and (ii) second operand provided by the MUX either from packet reader 810 (via path (i)) or from a GP register (via path (j)). A result of the operation performed by ALU 860 is loaded (via path (k)) by the MUX 850 to register RWDAT associated with the memory writer 830. At this point, the memory writer 830 writes (via path (l)) data from register RWDAT associated with the memory writer to the memory 1105. If CNT stored in register RRCFG associated with the memory reader 820 is larger than 1, then subsequent results are iteratively loaded (via path (k)) by the MUX 850 to register RWDAT associated with the memory writer 830. Further in this case, the memory writer 830 iteratively writes (via path (l)) the subsequent data from register RWDAT associated with the memory writer to different memory addresses of the memory 1105. Alternatively or additionally, the result of the operation performed by ALU 860 is loaded (via path (m)) by the MUX 850 to register PWR associated with the packet writer 840 to be included in the payload of an outgoing packet 140. If CNT stored in register RRCFG associated with the memory reader 820 is larger than 1, then subsequent results are iteratively loaded (via path (m)) by the MUX 850 to register PWR associated with the packet writer 840 to be successively appended to the payload of the outgoing packet 140.

When a conditional operation is performed by the ALU 860, a third operand is provided by MUX 850 either from the packet reader 810 (via path (i)) or from a GP register (via one of paths (j)). Once the condition has been checked by the ALU 860, the status register can be updated (via path (n)) as appropriate.

Further, if OP 166 from the MACR header 160 included in the received MACR packet 140*a* corresponds to a WRITE operation, then the packet reader 810 extracts write data from the MACR packet. The extracted write data is provided (via path (i)) to, and it is transmitted through, the MUX 850, such that it bypasses (via path (o)) the ALU 860, and it is loaded (via path (k)) to register RWDAT associated with the memory writer 830. At this point, the memory writer 830 writes (via path (l)) data from register RWDAT associated with the memory writer to the memory 1105.

Furthermore, if OP 166 from the MACR header 160 included in the received MACR packet 140*a* corresponds to a READ operation, then the memory reader 820 loads data—read (via path (b)) from the memory 1105 in register RRDAT associated with the memory reader. The data from register RRDAT associated with the memory reader 820 is provided (via path (h) to, and it is transmitted through, the MUX 850, such that it bypasses (via path (p)) the ALU 860, and it is loaded (via path (m)) to register PWR associated with the packet writer 840 to be included in the payload of an outgoing packet 140.

Multiple examples of use cases of a memory-attached computer resource like the ones disclosed above are described in detail below in connection with FIG. 12. Here, an example implementation of a memory-attached computer resource 800" interfaces with other computer resources of a computing system (e.g., 100C) in accordance with a network on a chip architecture, and with external memory 1105 (e.g., DRAM memory) via external memory interface 901. The memory-attached computer resource 800" includes the packet reader state machine 810, the memory reader state machine 820, the memory writer state machine 830, and the packet writer state machine 840 described above in connection with FIG. 9 and FIG. 11. Further, the memory-attached computer resource 800" includes a MUX, like the MUX 850 described above in connection with FIG. 9 and FIG. 11, which is implemented in the example illustrated in FIG. 12 as a SRC_MUX portion 850*a* that is controlled, among other things, by a source parameter 163 provided in an incoming MACR packet 140*a*; a CNT_MUX portion 850*b* that is controlled, among other things, by a count parameter 162 provided in the incoming MACR packet 140*a*; and a DST/COND_MUX portion 850*c* that is controlled, among other things, by a destination parameter 164 and a conditional parameter 165 provided in the incoming MACR packet 140*a*. Furthermore, the memory-attached computer resource 800" includes an ALU implemented as a LUT 860*. In addition, the memory-attached computer resource 800" includes multiple registers similar to the ones described above in connection with FIG. 11.

Figure 12:
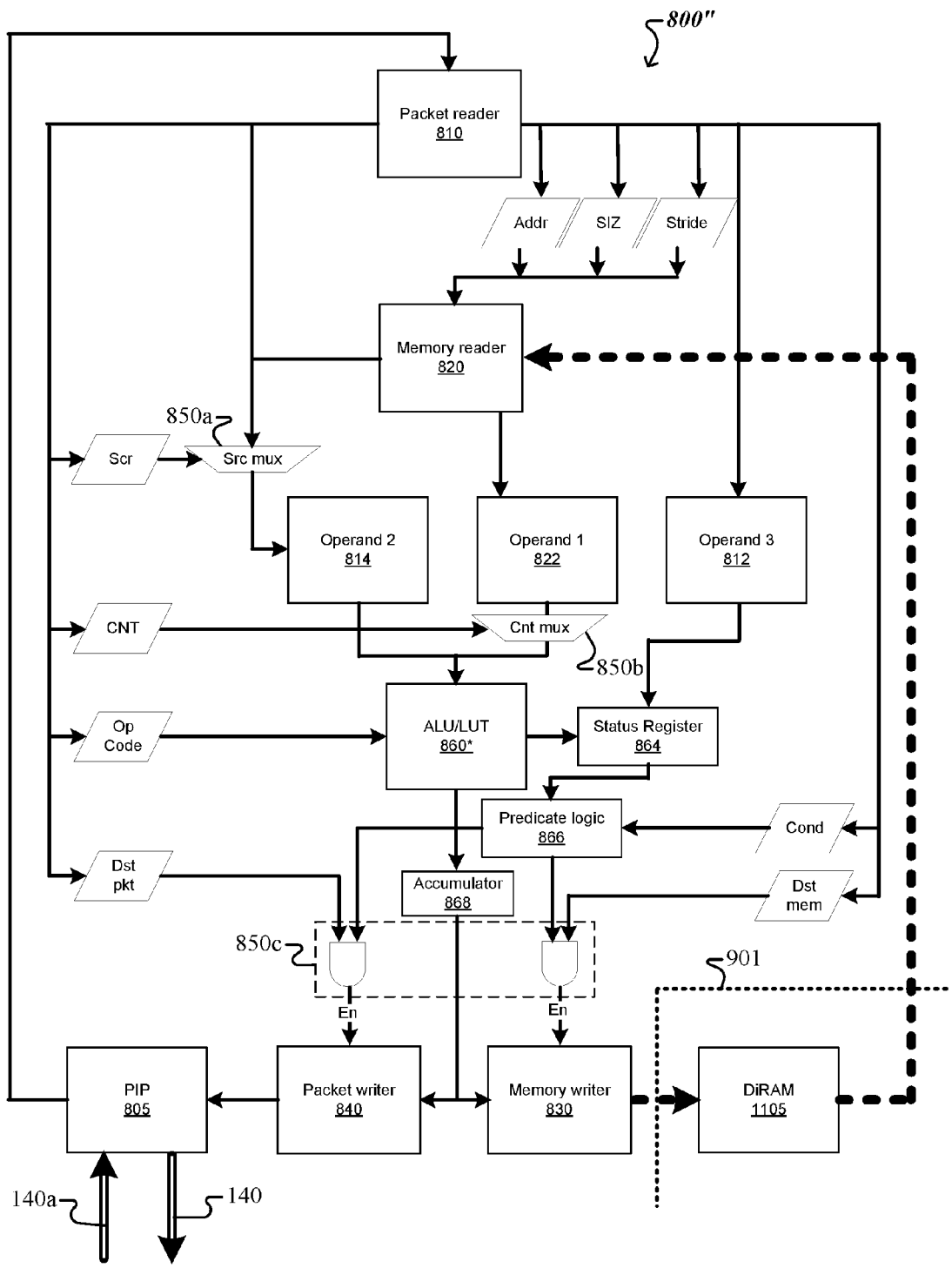
FIG. 12 shows an example of a read-modify-write operation performed by a memory-attached computing resource.

In the example illustrated in FIG. 12, the memory-attached computer resource 800" also includes a packet interface processor (PIP) 805 configured to receive incoming packets, e.g., MACR packets 140*a*, from processing engines 120, or other computing resources, of the computing system 100C. In some implementations, the PIP 803 manages the way in which successively received MACR packets 140 are relayed to the packet reader 810, e.g., it relays the received MACR packets in the order they have been received, or based on some other priority criterion. Additionally, the PIP 803 is configured to transmit outgoing packets 140 generated by the packet writer 840 to carry, in some cases, results of the operation(s) performed by the ALU 860 back to another computing resource of the computing system 100C.

A first example of a use case of the memory-attached computer resource 800" is adding 10 values to respective 10 data items stored in the memory 1105 if and only if a result of the addition is less than or equal to a limit value. A request to perform this operation is provided to the memory-attached computer resource 800" in a received MACR packet 140*a*, and the operation is performed by the ALU/LUT 860* in the following manner.

The PIP 803 relays the received MACR packet 140*a* to the packet reader 810. The packet reader 810 extracts, from the header 142*a* of the relayed MACR packet 140*a*, the following values for the fields ADDR 150 and Op Code 146: ADDR=base_address and Op Code=MACR. The value ADDR=base_address is loaded to a register associated with the memory reader 820 (e.g., to register RRADR) to indicate a location of Operand 1. The value Op Code=MACR indicates that the relayed MACR packet 140*a* includes a MACR header 160. Then, the packet reader 810 extracts from the MACR header 160 the following values for the fields OP 166, CNT 162, SIZ 161, Stride 167, COND 165, Data 168, SRC 163 and DST 164: OP=ADD, CNT=10, SIZ=3, Stride=8, COND=NOT>, Data=limit_value, SRC=1, DST=3 (i.e., both the memory 1105 and the outgoing packet 140). The values OP=ADD and COND=NOT> are loaded into registers associated with the ALU/LUT 860* to indicate that the operation to be performed is a predicate addition. For example, the value COND=NOT> is loaded to a predicate logic register 866 associated with the ALU/LUT 860*. Further, the values SRC=1 and DST=3 are loaded into corresponding registers associated with the MUX portions 850a, 850b, 850c to respectively indicate that (i) the source of Operand 2 is the relayed MACR packet 140a, and (ii) the result of the predicate addition is to be written back to the memory 1105 by the memory writer 830 and to be included in an outgoing packet 140 generated by the packet writer 840. For example, Operand 2 can be extracted by the packet reader 810 from the relayed MACR packet 140a and uploaded to register 814 associated with the packet reader (where register 814 can be one of the GP registers described above in Table 3). Furthermore, the values CNT=10, SIZ=3, Stride=8 are loaded to another register associated with the memory reader 820 (e.g., to register RRCFG described above in Table 3). Also, the value Data=limit_value is loaded in register 812 associated with the packet reader 810 (where register 812 can be one of the GP registers described above in Table 3) to indicate that Operand 3 is provided in the relayed MACR packet 140a.

The memory reader 820 reads Operand 1 from the memory 1105 using the address loaded in register RRADR and loads the read Operand 1 in another register 822 associated with the memory reader. The other register 822 can be register RRADR described above in Table 3, for instance. At this point, the MUX portions 850b, 850a can route Operand 1 from register 822 and Operand 2 from register 814 to the ALU/LUT 860* where they will be added together, and an addition result is uploaded to an accumulator register 868 (which can be one of the GP registers described above in Table 3). In addition, the ALU/LUT 860* sets the status register 864 based on characteristics of the addition result. For example, bits of the status register 864 are set based on whether the addition result is zero or positive, whether there is no overflow, whether there is no carry, etc. The status register is being set in this manner to ensure capability of the memory-attached computer resource 800" for responding to and setting event flags.

The MUX portion 850c uses a pair of AND gates to conditionally route the result from the accumulator register 868 to the memory writer 830 or the packet writer 840 or both. As such, transport of the result from the accumulator register 868 to the memory writer 830 and/or the packet writer 840 is enabled if DST=3 and a value stored in the predicate logic register 866 indicates that the result from the accumulator register satisfies COND=NOT> relative to Operand 3 from register 812. When the MUX portion 850c enables transport of the result from the accumulator register 868 to the memory writer 830, the latter writes the result back to the memory 1105 at the address of Operand 1. Also, when the MUX portion 850c enables transport of the result from the accumulator register 868 to the packet writer 840, the latter writes the result to the payload of an outgoing packet 140.

The above sequence of steps used by the ALU/LUT 860* to perform the predicated addition of Operand 1 and Operand 2 will be iterated 10 times, in accordance with the value CNT=10. Each instance of Operand 1—that is 4 bytes, in accordance with the value SIZ=3, and is separated from the next instance of Operand 1 by 8 bytes, in accordance with the value Stride=8—is uploaded by the memory reader 820 to register 822, for each of the 10 iterations of the predicate addition operation to be performed by the ALU/LUT 860*. Also, there are 10 values of Operand 2 included in the payload 144a of the relayed MACR packet 140a, in accordance with SRC=1, each of which is uploaded by the packet reader 810 to register 814, for each of the 10 iterations of the predicate addition operation to be performed by the ALU/LUT 860*. The result of each iteration of the predicate addition operation performed by the ALU/LUT 860* is temporarily stored in the accumulator register 866, and conditionally moved by the MUX 850c portion to the memory writer 830 for writing to the memory 1105 as the respective modified instance of Operand 1, and/or to the memory writer 840 for appending to the payload of the outgoing packet 140, in this case, as the respective modified instance of Operand 2.

Note that, upon completion of the 10 iterations of the predicate addition operation, the packet writer 840 uploads the completed outgoing packet 140 to a transmission queue of the PIP 803. In this manner, the PIP 803 can transmit the outgoing packet including the 10 results of the predicate addition performed by the ALU/LUT 860*, i.e., the 10 modified values of Operand 2, to a destination processing engine 120 of the computing system 100C.

A second example of a use case of the memory-attached computer resource 800" is zeroing every fourth byte for a kilobyte of the memory 1105. In this case, the packet reader 810 extracts, from the header 142a of a MACR packet 140a received by the memory-attached computer resource 800", the following values for the fields Op Code 146, ADDR 150 and PKT SIZ 145: Op Code=MACR, ADDR=base_address, and PKT SIZ=3. The value Op Code=MACR indicates that the received MACR packet 140a includes a MACR header 160. Then, the packet reader 810 extracts from the MACR header 160 the following values for the fields OP 166, CNT 162, Stride 167, SIZ 161: OP=WRITE, CNT=255, Stride=3, SIZ=0. In addition, the payload 144a of the received MACR packet 140a includes write data 152 in the form of a word containing 0 (zero).

A third example of a use case of the memory-attached computer resource 800" is performing endianness conversion for a longword stored at a location in the memory 1105. In this case, the packet reader 810 extracts, from the header 142a of a MACR packet 140a received by the memory-attached computer resource 800", the following values for the fields Op Code 146 and ADDR 150: Op Code=MACR and ADDR=location. The value Op Code=MACR indicates that the received MACR packet 140a includes a MACR header 160. Then, the packet reader 810 extracts from the MACR header 160 the following values for the fields OP 166, CNT 162 and SIZ 161: OP=BSWAP, CNT=16, and SIZ=2. Here, no additional data relating to the MACR operation is included in the payload 144a of the received MACR packet 140a.

A fourth example of a use case of the memory-attached computer resource 800" is allocating and writing a block of the memory 1105. In this case, the packet reader 810 extracts, from the header 142a of a MACR packet 140a received by the memory-attached computer resource 800", the following values for the fields Op Code 146 and ADDR 150: Op Code=MACR, and ADDR=vector_address. The value Op Code=MACR indicates that the received MACR packet 140a includes a MACR header 160. Note that in this case, the payload 144a of the received MACR packet 140a includes multiple MACR headers 160-j, where j=1 . . . 4. In this case, the ALU/LUT 860* will perform a first operation corresponding to first OP 166 of a first MACR header 160-1, followed by a second operation corresponding to second OP 166 of a second MACR header 160-2, and so on, until it will complete the last operation corresponding to last OP 166 of a last MACR header 160-4. Note that the value address ADDR=vector_address is used to retrieve Operand 1 for the first operation corresponding to the first OP 166. The result of each operation corresponding to the $j^{th}$ OP 166 is loaded by the ALU/LUT 860* in the accumulator register 868 (e.g., one of the GP registers R0, R1, R2, R3 shown in FIG. 11), and the value from the accumulator register is then moved (via one of the paths (j')) by the MUX to the ALU/LUT 860* where it is to be used as Operand 1 of the next operation corresponding to the $(j+1)^{th}$ OP 166.

In this manner, the packet reader 810 extracts from the first MACR header 160-1 the following values for the fields OP 166, COND 165, DST 164: OP=FFCS, COND=ALWAYS, DST=2 (to outgoing packet 140). In addition, the payload 144a of the received MACR packet 140a includes a destination header 154 addressed to the originating processing engine 120 that transmitted the received MACR packet 140a.

Further, the packet reader 810 extracts from the second MACR header 160-2 the following values for the fields OP 166, SRC 163, SIZ 161, COND 165, DATA 168, DST 164: OP=SHL, SRC=1, SIZ=4, COND=ALWAYS, DATA=6, DST=0 (neither to the memory nor to the outgoing packet 140). No additional data relating to an operation corresponding to the second OP 166.

Furthermore, the packet reader 810 extracts from the third MACR header 160-3 the following values for the fields OP 166, SRC 163, SIZ 161, COND 165, DATA 168, DST 164: OP=ADD, SRC=1, SIZ=4, COND=ALWAYS, DATA=Base_Addr, DST=0 (neither to the memory nor to the outgoing packet 140). No additional data relating to an operation corresponding to the third OP 166.

Also, the packet reader 810 extracts from the fourth MACR header 160-4 the following values for the fields OP 166, CNT 162, SIZ 161, COND 165, SRC 163, DST 164: OP=WRITE, CNT=4, SIZ=4, COND=ALWAYS, SRC=0, DST=1 (to the memory 1105). In addition, the payload 144a of the received MACR packet 140a includes four longwords of write data 152.

A fifth example of a use case of the memory-attached computer resource 800" is freeing a previously allocated block of the memory 1105. In this case, the packet reader 810 extracts, from the header 142a of a MACR packet 140a received by the memory-attached computer resource 800", the following values for the fields Op Code 146 and ADDR 150: Op Code=MACR and ADDR=vector_address. The value Op Code=MACR indicates that the received MACR packet 140a includes a MACR header 160. Then, the packet reader 810 extracts from the MACR header 160 the following values for the fields OP 166, SCR 163, Data 168, COND 165 and DST 164: OP AND, SCR=1, Data=[filled by originating processing engine 120 that transmitted the received MACR packet 140a], COND=ALWAYS, and DST=1 (to the memory 1105). Here, no additional data relating to the MACR operation is included in the payload 144a of the received MACR packet 140a.

In some implementations, a computing resource may be configured as specified in the following clauses.

1. A computing resource attached to a memory that is external to the computing resource, the memory-attached computing resource comprising:

a packet reader state machine configured to receive a packet from another computing resource unattached to the memory, the received packet comprising a header and a payload, the header including a memory address of the memory, and the payload including one or more operation codes;

a memory reader state machine configured to access the memory and read data from the memory address;

an arithmetic logic unit (ALU) state machine configured to process the read data based at least in part on the one or more operation codes; and a memory writer state machine configured to access the memory and write the processed data.

2. The memory-attached computing resource of clause 1, wherein the payload of the received packet further includes an address of a notification target; and the memory-attached computing resource further comprises a packet writer state machine configured to transmit, to the address of the notification target, a packet including an indication that the data at the memory address has been processed.

3. The memory-attached computing resource of clause 1, wherein the payload of the received packet further includes an address of a destination; and the memory-attached computing resource further comprises a packet writer state machine configured to transmit, to the address of the destination, a packet including the processed data.

4. The memory-attached computing resource of any one of clauses 1-3, further comprising:

a multiplexer configured to route the read data from the memory reader state machine to the ALU state machine, and the processed data from the ALU state machine to the memory writer state machine.

5. The memory-attached computing resource of clause 4, further comprising a first table that includes a plurality of predefined operation codes corresponding to operations to be performed by the memory-attached computing resource; and a second table comprising code items corresponding to the predefined operation codes, wherein the multiplexer is selectively configured to route the read data and the processed data in accordance with a decoded operation code using one or more code items from the second table corresponding to a predefined operation code from the first table that matches the decoded operation code.

6. The memory-attached computing resource of clause 5, wherein the payload of the received packet further includes data relating to a new operation code, and one or more code items to be used to configure the multiplexer, the one or more code items correspond to the new operation code, and the packet reader state machine is configured to add the new operation code as a new opcode to the first table, and the corresponding one or more code items as new code items to the second table.

7. The memory-attached computing resource of clause 4, wherein the multiplexer is configured to route to the ALU state machine a first portion of the read data as a first operand, and a second portion of the read data as a second operand.

8. The memory-attached computing resource of clause 4, wherein
the multiplexer is configured to route to the ALU state machine
the read data as a first operand, and
second data included in the received packet as a second operand.

9. The memory-attached computing resource of clause 7 or 8, wherein
a decoded opcode corresponds to a conditional operation, and
the multiplexer is configured to route to the ALU state machine third data included in the payload of the received packet as a third operand.

10. The memory-attached computing resource of clause 1, wherein the memory writer state machine is configured to write the processed data back to the memory address where data was read from by the memory reader state machine.

11. The memory-attached computing resource of clause 1, further comprising
a packet interface processor configured to delay decoding another packet until the processed data has been written to the memory.

12. The memory-attached computing resource of clause 1, wherein the memory comprises RAM.

In some implementations, a method may be specified as in the following clauses.

13. A method comprising:
receiving, by a packet reader state machine of a computing resource, from another computing resource, a packet including (i) a memory address of memory that is external to the computing resource, and (ii) one or more operation codes, wherein the computing resource is attached to the memory and the other computing resource is unattached to the memory;
accessing, by a memory reader state machine of the memory-attached computing resource, the memory and reading data from the memory address;
processing, by an arithmetic logic unit (ALU) of the memory-attached computing resource, the read data based at least in part on the one or more operation codes; and
accessing, by a memory writer state machine of the memory-attached computing resource, the memory and writing the processed data.

14. The method of clause 13, wherein
the received packet further includes an address of a notification target; and
the method further comprises transmitting, by a packet writer state machine of the memory-attached computing resource to the address of the notification target, a packet including an indication that the data at the memory address has been processed.

15. The method of clause 13, wherein
the received packet further includes an address of a destination; and
the method further comprises transmitting, by a packet writer state machine of the memory-attached computing resource to the address of the destination, a packet including the processed data.

16. The method of any one of clauses 13-15 further comprising:
routing, by a multiplexer included in the memory-attached computing resource,
the read data from the memory reader state machine to the ALU, and
the processed data from the ALU to the memory writer state machine.

17. The method of clause 16, wherein
the memory-attached computing resource further comprise
a first table that includes a plurality of predefined operation codes corresponding to operations to be performed by the memory-attached computing resource, and
a second table comprising code items corresponding to the predefined operation codes, and
the method further comprises
matching a predefined operation code from the first table to the decoded operation code; and
selectively configuring the multiplexer to route the read data and the processed data using one or more code items from the second table corresponding to the matched predefined operation code.

18. The method of clause 17, wherein
the received packet further includes data relating to
a new operation code, and
one or more code items to be used to configure the multiplexer, the one or more code items correspond to the new operation code, and
the method further comprising adding, by the packet reader state machine,
the new operation code as a new opcode to the first table, and
the corresponding one or more code items as new code items to the second table.

19. The method of clause 16, further comprising
routing, by the multiplexer to the ALU,
a first portion of the read data as a first operand, and
a second portion of the read data as a second operand.

20. The method of clause 16, further comprising
routing, by the multiplexer to the ALU,
the read data as a first operand, and
second data included in the received packet as a second operand.

21. The method of clause 19 or 20, wherein
a decoded opcode corresponds to a conditional operation, and
the method further comprises routing, by the multiplexer to the ALU, third data included in a payload of the received packet as a third operand.

22. The method of clause 13, wherein the writing of the processed data back to the memory comprises writing the processed data back to the memory address where data was read from by the memory reader state machine.

23. The method of clause 13, further comprising
delaying, by a packet interface processor included in the memory-attached computing resource, decoding another packet until the processed data has been written back to the memory.

24. The method of clause 13, wherein the memory comprises RAM.

In some implementations, a computing system may be configured as specified in the following clauses.

25. A computing system comprising:
a plurality of computing resources communicating with each other using packets, wherein a computing resource from among the plurality of computing resources is attached to memory external to the computing system through an external memory interface, the memory-attached computing resource comprising:
a first set of logical gates configured as a packet reader state machine to decode a packet received from another of the computing resources into state machine parameters including (i) a memory address of the memory, and (ii) one or more operation codes;

a second set of logical gates configured as a memory reader state machine to read data from the memory address;

an arithmetic logic unit (ALU) configured to process the read data based at least in part on the one or more operation codes; and a third set of logical gates configured as a memory writer state machine to write processed data back to the memory.

26. The computing system of clause 25, wherein the state machine parameters further include an address of a notification target; and the memory-attached computing resource further comprises a fourth set of logical gates configured as a packet writer state machine to transmit, to the notification target based on the state machine parameters, a packet including an indication that the data at the memory address has been processed.

27. The computing system of clause 25, wherein the state machine parameters further include an address of a destination; and the memory-attached computing resource further comprises a fourth set of logical gates configured as a packet writer state machine to transmit, to the destination based on the state machine parameters, a packet including the processed data.

28. The computing system of any one of clauses 25-27, wherein the memory-attached computing resource further comprises:

a multiplexer configured to route the read data from the second set of logical gates configured as the memory reader state machine to the ALU, and the processed data from the ALU to the third set of logical gates configured as the memory writer state machine.

29. The computing system of clause 28, wherein the memory-attached computing resource further comprises:

a first table that includes a plurality of predefined operation codes corresponding to operations to be performed by the memory-attached computing resource; and a second table comprising code items corresponding to the predefined operation codes, wherein the multiplexer is selectively configured to route the read data and the processed data in accordance with a decoded operation code using one or more code item from the second table corresponding to a predefined operation code from the first table that matches the decoded operation code.

30. The computing system of clause 29, wherein the packet received from the other of the computing resources further includes data relating to a new operation code, and one or more code items to be used to configure the multiplexer, the one or more code items correspond to the new operation code, and the first set of logical gates configured as the packet reader state machine is configured to add the new operation code as a new opcode to the first table, and the corresponding one or more code items as new code items to the second table.

31. The computing system of clause 28, wherein the multiplexer is configured to route to the ALU a first operand as a first portion of the read data, and a second operand as a second portion of the read data.

32. The computing system of clause 28, wherein the multiplexer is configured to route to the ALU a first operand as the read data, and a second operand as second data included in the packet received from the other of the computing resources.

33. The computing system of clause 31 or 32, wherein a decoded opcode corresponds to a conditional operation, and the multiplexer is configured to route to the ALU a third operand as third data included in payload of the packet received from the other of the computing resources.

34. The computing system of clause 25, wherein the third set of logical gates configured as the memory writer state machine writes the processed data back to the memory address where data was read from by the second set of logical gates configured as the memory reader state machine.

35. The computing system of clause 25, wherein the memory-attached computing resource further comprises a packet interface processor configured to delay decoding another packet until the processed data has been written back to the memory.

36. The computing system of clause 25, wherein the memory is RAM.

37. The computing system of clause 25, wherein at least some of the plurality of computing resources different from the memory-attached computing resource are processing engines, and at least a portion of the computing system that includes the memory-attached computing resource and the processing engines is implemented as a system on a chip (SoC).

38. The computing system of clause 25, wherein at least some of the plurality of computing resources different from the memory-attached computing resource are processing engines, and at least one of the processing engines is implemented as a microprocessor, a microcontroller, a field programmable gate array (FPGA) or an application specific integrated circuit (ASIC).

In the above description, numerous specific details have been set forth in order to provide a thorough understanding of the disclosed technologies. In other instances, well known structures, interfaces, and processes have not been shown in detail in order to avoid unnecessarily obscuring the disclosed technologies. However, it will be apparent to one of ordinary skill in the art that those specific details disclosed herein need not be used to practice the disclosed technologies and do not represent a limitation on the scope of the disclosed technologies, except as recited in the claims. It is intended that no part of this specification be construed to effect a disavowal of any part of the full scope of the disclosed technologies. Although certain embodiments of the present disclosure have been described, these embodiments likewise are not intended to limit the full scope of the disclosed technologies.

While specific embodiments and applications of the disclosed technologies have been illustrated and described, it is to be understood that the disclosed technologies are not limited to the precise configuration and components disclosed herein. The terms, descriptions and figures used herein are set forth by way of illustration only and are not meant as limitations. Various modifications, changes, and variations which will be apparent to those skilled in the art may be made in the arrangement, operation, and details of the apparatuses, methods and systems of the disclosed technologies disclosed herein without departing from the spirit and scope of the disclosed technologies. By way of non-limiting example, it will be understood that the block diagrams included herein are intended to show a selected subset of the components of each apparatus and system, and each pictured apparatus and system may include other components which are not shown on the drawings. Additionally, those with ordinary skill in the art will recognize that certain steps and functionalities described herein may be omitted or re-ordered without detracting from the scope or performance of the embodiments described herein.

The various illustrative logical blocks, modules, circuits, and algorithm steps described in connection with the embodiments disclosed herein may be implemented as electronic hardware, computer software, or combinations of both. To illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. The described functionality can be implemented in varying ways for each particular application—such as by using any combination of control circuitry, e.g., state machines, microprocessors, microcontrollers, field programmable gate arrays (FPGAs), application specific integrated circuits (ASICs), and/or System on a Chip (SoC)—but such implementation decisions should not be interpreted as causing a departure from the scope of the disclosed technologies.

The steps of a method or algorithm described in connection with the embodiments disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art.

The methods disclosed herein comprise one or more steps or actions for achieving the described method. The method steps and/or actions may be interchanged with one another without departing from the scope of the disclosed technologies. In other words, unless a specific order of steps or actions is required for proper operation of the embodiment, the order and/or use of specific steps and/or actions may be modified without departing from the scope of the disclosed technologies.

What is claimed is:

1. A computing resource attached to a memory that is external to the computing resource, the memory-attached computing resource comprising:
    (a) a first set of logical gates configured as a packet reader state machine to receive a packet from a first one of a plurality of computing resources different from the memory-attached computing resource and unattached to the memory, the memory-attached computing resource and at least a subset of the plurality of computing resources being implemented as a system on a chip, the received packet comprising (i) a memory address of the memory, (ii) one or more operation codes, and (iii) an address of a second one of the plurality of computing resources;
    (b) a second set of logical gates configured as a memory reader state machine to access the memory and read data from the memory address;
    (c) an arithmetic logic unit (ALU) configured to process the read data based at least in part on the one or more operation codes;
    (d) a third set of logical gates configured as a memory writer state machine to access the memory and write the processed data;
    (e) a fourth set of logical gates configured as a packet writer state machine to transmit, to the address of the second one of the plurality of computing resources, one of the following packets:
        (i) a packet including an indication that the data at the memory address has been processed, or
        (ii) a packet including the processed data; and
    (f) a multiplexer configured to route, within the memory-attached computing resource, at least the following data:
        (i) the read data from the second set of logical gates to the ALU, and
        (ii) the processed data from the ALU to the third set of logical gates and to the fourth set of logical gates.

2. The memory-attached computing resource of claim 1, further comprising
    a first table that includes a plurality of predefined operation codes corresponding to operations to be performed by the memory-attached computing resource; and
    a second table comprising code items corresponding to the predefined operation codes,
    wherein the multiplexer is selectively configured to route the read data from the second set of logical gates configured as the memory reader state machine and the processed data from the ALU in accordance with a decoded operation code using one or more code items from the second table corresponding to a predefined operation code from the first table that matches the decoded operation code.

3. The memory-attached computing resource of claim 2, wherein
    the payload of the received packet further includes data relating to
        a new operation code, and
        one or more code items to be used to configure the multiplexer, the one or more code items correspond to the new operation code, and
    the first set of logical gates is configured as the packet reader state machine further to add
        the new operation code as a new opcode to the first table, and
        the corresponding one or more code items as new code items to the second table.

4. The memory-attached computing resource of claim 1, wherein the multiplexer is configured to route, from the second set of logical gates configured as the memory reader state machine to the ALU, a first portion of the read data as a first operand, and a second portion of the read data as a second operand, for the ALU to process the first and second operands.

5. The memory-attached computing resource of claim 1, wherein the multiplexer is configured to route to the ALU,
    (a) from the second set of logical gates configured as the memory reader state machine, the read data as a first operand, and
    (b) from the first set of logical gates configured as the packet reader state machine, second data included in the received packet as a second operand.

6. The memory-attached computing resource of claim 5, wherein
    a decoded opcode corresponds to a conditional operation, and
    the multiplexer is configured to route to the ALU, from the first set of logical gates configured as the packet reader state machine, third data included in the payload of the received packet as a third operand.

7. The memory-attached computing resource of claim 1, wherein the third set of logical gates configured as the memory writer state machine is configured to write the processed data back to the memory address where data was read from by the second set of logical gates configured as the memory reader state machine.

8. The memory-attached computing resource of claim 1, further comprising
a packet interface processor configured to delay decoding, by the first set of logical gates configured as the packet reader state machine, another packet until the processed data has been written to the memory by the third set of logical gates configured as the memory writer state machine.

9. The memory-attached computing resource of claim 1, wherein the memory comprises RAM.

10. The memory-attached computing resource of claim 1, wherein the second one of the plurality of computing resources is different from the first one of the plurality of computing resources.

11. A method comprising:
receiving, by a first set of logical gates configured as a packet reader state machine of a memory-attached computing resource, from a first one of a plurality of computing resources, a packet including (i) a memory address of memory that is external to the computing resource, (ii) one or more operation codes, and (iii) an address of a second one of the plurality of computing resources, wherein the memory-attached computing resource is attached to the memory and the computing resources of the plurality are unattached to the memory, and the memory-attached computing resource and at least a subset of the plurality of computing resources are implemented as a system on a chip;
accessing, by a second set of logical gates configured as a memory reader state machine of the memory-attached computing resource, the memory and reading data from the memory address;
processing, by an arithmetic logic unit (ALU) of the memory-attached computing resource, the read data based at least in part on the one or more operation codes;
accessing, by a third set of logical gates configured as a memory writer state machine of the memory-attached computing resource, the memory and writing the processed data;
transmitting, by a fourth set of logical gates configured as a packet writer state machine of the memory-attached computing resource, to the address of the second one of the plurality of computing resources, one of the following packets:
a packet including an indication that the data at the memory address has been processed, or
a packet including the processed data; and
routing, by a multiplexer included in the memory-attached computing resource, at least the following data:
the read data from the second set of logical gates configured as the memory reader state machine to the ALU, and
the processed data from the ALU to the third set of logical gates configured as the memory writer state machine and to the fourth set of logical gates configured as the packet writer state machine.

12. The method of claim 11, wherein the routing the read data, by the multiplexer from the second set of logical gates configured as the memory reader state machine to the ALU, comprises
routing a first portion of the read data as a first operand, and a second portion of the read data as a second operand, for the ALU to process the first and second operands.

13. The method of claim 12, wherein
a decoded opcode corresponds to a conditional operation, and
the method further comprises routing, by the multiplexer from the first set of logical gates configured as the packet reader state machine to the ALU, third data included in a payload of the received packet as a third operand.

14. The method of claim 11, wherein the writing of the processed data back to the memory comprises writing the processed data back to the memory address where data was read from by the second set of logical gates configured as the memory reader state machine.

15. The method of claim 11, wherein the second one of the plurality of computing resources is different from the first one of the plurality of computing resources.

16. A computing system comprising:
a plurality of computing resources communicating with each other using packets,
wherein a computing resource from among the plurality of computing resources is attached to memory external to the computing system through an external memory interface, and remaining ones of the plurality of computing resources different from the memory-attached computing resource are unattached to the memory,
wherein at least a portion of the computing system that includes the memory-attached computing resource and at least a subset of the unattached computing resources is implemented as a system on a chip (SoC), and
wherein the memory-attached computing resource comprises:
(a) a first set of logical gates configured as a packet reader state machine to decode a packet received from a first one of the plurality of computing resources into state machine parameters including (i) a memory address of the memory, (ii) one or more operation codes, and (iii) an address of a second one of the plurality of computing resources;
(b) a second set of logical gates configured as a memory reader state machine to read data from the memory address;
(c) an arithmetic logic unit (ALU) configured to process the read data based at least in part on the one or more operation codes;
(d) a third set of logical gates configured as a memory writer state machine to write processed data back to the memory;
(e) a fourth set of logical gates configured as a packet writer state machine to transmit, to the address of the second one of the plurality of computing resources, one of the following packets:
(i) a packet including an indication that the data at the memory address has been processed, or
(ii) a packet including the processed data; and
(f) a multiplexer configured to route, within the memory-attached computing resource, at least the following data:

(i) the read data from the second set of logical gates to the ALU, and
(ii) the processed data from the ALU to the third set of logical gates and to the fourth set of logical gates.

17. The computing system of claim 16, wherein at least some of the plurality of computing resources, which are different from the memory-attached computing resource and are part of the portion of the computing system implemented as the SoC are processing engines.

18. The computing system of claim 16, wherein at least one of the plurality of computing resources, which is different from the memory-attached computing resource and is part of the computing system implemented as the SoC, is implemented as a microprocessor, a microcontroller, a field programmable gate array (FPGA) or an application specific integrated circuit (ASIC).

19. The computing system of claim 16, wherein the second one of the plurality of computing resources is different from the first one of the plurality of computing resources.

20. The computing system of claim 16, wherein the memory-attached computing resource further comprises:
a first table that includes a plurality of predefined operation codes corresponding to operations to be performed by the memory-attached computing resource; and
a second table comprising code items corresponding to the predefined operation codes,
wherein the multiplexer is selectively configured to route the read data from the second set of logical gates configured as the memory reader state machine and the processed data from the ALU in accordance with a decoded operation code using one or more code items from the second table corresponding to a predefined operation code from the first table that matches the decoded operation code.

21. The computing system of claim 16, wherein the multiplexer is configured to route, from the second set of logical gates configured as the memory reader state machine to the ALU, a first portion of the read data as a first operand, and a second portion of the read data as a second operand, for the ALU to process the first and second operands.

22. The computing system of claim 16, wherein the multiplexer is configured to route to the ALU,
(a) from the second set of logical gates configured as the memory reader state machine, the read data as a first operand, and
(b) from the first set of logical gates configured as the packet reader state machine, second data included in the received packet as a second operand.

23. The computing system of claim 22, wherein
a decoded opcode corresponds to a conditional operation, and
the multiplexer is configured to route to the ALU, from the first set of logical gates configured as the packet reader state machine, third data included in the payload of the received packet as a third operand.

24. The computing system of claim 16, wherein the third set of logical gates configured as the memory writer state machine is configured to write the processed data back to the memory address where data was read from by the second set of logical gates configured as the memory reader state machine.

25. The computing system of claim 16, wherein the memory-attached computing resource further comprises:
a packet interface processor configured to delay decoding, by the first set of logical gates configured as the packet reader state machine, another packet until the processed data has been written to the memory by the third set of logical gates configured as the memory writer state machine.

26. The computing system of claim 16, wherein the memory comprises RAM.

* * * * *